(12) United States Patent
Fujino

(10) Patent No.: US 12,242,093 B2
(45) Date of Patent: Mar. 4, 2025

(54) OPTICAL LAMINATE AND METHOD FOR DETERMINING AUTHENTICITY THEREOF, AND ARTICLE

(71) Applicant: ZEON CORPORATION, Tokyo (JP)

(72) Inventor: Yasuhide Fujino, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 18/262,728

(22) PCT Filed: Jan. 26, 2022

(86) PCT No.: PCT/JP2022/002908
§ 371 (c)(1),
(2) Date: Jul. 25, 2023

(87) PCT Pub. No.: WO2022/168709
PCT Pub. Date: Aug. 11, 2022

(65) Prior Publication Data
US 2024/0241299 A1    Jul. 18, 2024

(30) Foreign Application Priority Data

Feb. 5, 2021 (JP) .................................. 2021-017650

(51) Int. Cl.
*G02B 5/30* (2006.01)
*B42D 25/364* (2014.01)
(Continued)

(52) U.S. Cl.
CPC .......... *G02B 5/3016* (2013.01); *B42D 25/364* (2014.10); *G07D 7/003* (2017.05);
(Continued)

(58) Field of Classification Search
CPC ............ G02F 1/1335; G02F 1/133528; G02F 1/133531; G02F 1/133536;
(Continued)

(56) References Cited

U.S. PATENT DOCUMENTS

2003/0184862 A1    10/2003  Sahouani et al.
2005/0271873 A1*   12/2005  Kameyama .......... G02B 5/3033
                                                      428/343
(Continued)

FOREIGN PATENT DOCUMENTS

EP          1126292 A2    8/2001
EP          3816683 A1    5/2021
(Continued)

OTHER PUBLICATIONS

Patent Translate JP 2009300655.*
(Continued)

*Primary Examiner* — Thoi V Duong
(74) *Attorney, Agent, or Firm* — KENJA IP LAW PC

(57) ABSTRACT

An optical layered body comprising a polarized light separation layer and a first display layer, wherein: the polarized light separation layer is a linear polarizer including one of an absorptive linear polarizer and a reflective linear polarizer; the first display layer is a linear polarizer including the other of the absorptive linear polarizer and the reflective linear polarizer; the first display layer overlaps with a part of the polarized light separation layer; and an average degree of polarization of the polarized light separation layer at a wavelength of 400 nm to 680 nm is 0.60 or more.

12 Claims, 5 Drawing Sheets

(51) Int. Cl.
*G02F 1/1335* (2006.01)
*G07D 7/00* (2016.01)
*G07D 7/1205* (2016.01)

(52) U.S. Cl.
CPC ..... *G07D 7/1205* (2017.05); *G02F 1/133528* (2013.01); *G02F 1/133536* (2013.01)

(58) Field of Classification Search
CPC ......... G02F 1/133541; G02F 1/133543; G02F 1/133545; G02F 1/133548; G02B 5/30; G02B 5/3016; G02B 5/3041; G02B 5/305; G07D 7/003; G07D 7/1205; B42D 25/364; B42D 25/391
See application file for complete search history.

(56) References Cited

U.S. PATENT DOCUMENTS

| | | |
|---|---|---|
| 2015/0285979 A1 | 10/2015 | Aimatsu |
| 2016/0245972 A1 | 8/2016 | Yamanaka et al. |
| 2019/0243045 A1 | 8/2019 | Inada et al. |
| 2020/0264358 A1 | 8/2020 | Kawabata |

FOREIGN PATENT DOCUMENTS

| | | | |
|---|---|---|---|
| JP | H09507308 A | | 7/1997 |
| JP | 2003513299 A | | 4/2003 |
| JP | 2007057971 A | | 3/2007 |
| JP | 2009300655 A | * | 12/2009 |
| JP | 2009300662 A | | 12/2009 |
| JP | 2011115974 A | | 6/2011 |
| JP | 2014174471 A | | 9/2014 |
| JP | 2015072396 A | | 4/2015 |
| JP | 5828182 B2 | | 12/2015 |
| JP | 6142714 B2 | | 6/2017 |
| JP | 2022035801 A | | 3/2022 |
| WO | 2014069515 A1 | | 5/2014 |
| WO | 2015064581 A1 | | 5/2015 |
| WO | 2018079606 A1 | | 5/2018 |
| WO | 2019059067 A1 | | 3/2019 |
| WO | 2020004155 A1 | | 1/2020 |

OTHER PUBLICATIONS

Aug. 3, 2023, International Preliminary Report on Patentability issued in the International Patent Application No. PCT/JP2022/002908.

Apr. 5, 2022, International Search Report issued in the International Patent Application No. PCT/JP2022/002908.

Michael F. Weber et al., Giant Birefringent Optics in Multilayer Polymer Mirrors, Science, Mar. 31, 2000, pp. 2451-2456, vol. 287.

* cited by examiner

OPTICAL LAMINATE AND METHOD FOR DETERMINING AUTHENTICITY THEREOF, AND ARTICLE

TECHNICAL FIELD

The present invention relates to an optical layered body and a method for determining authenticity thereof, and an article including the optical layered body.

BACKGROUND ART

In order to determine whether an article is an authentic product supplied from an original manufacturer, an identification medium that cannot be easily replicated is generally provided in the article. As such an identification medium, an optical layered body formed using a resin having cholesteric regularity has been known (Patent Literature 1). Techniques like those described in Patent Literatures 2 and 3 have also been known.

CITATION LIST

Patent Literature

Patent Literature 1: International Publication No. 2020/004155
Patent Literature 2: International Publication No. 2018/079606
Patent Literature 3: Japanese Patent No. 5828182

SUMMARY OF THE INVENTION

Technical Problem

In general, the resin having cholesteric regularity can reflect circularly polarized light having either a clockwise rotation direction or a counterclockwise rotation direction and transmit circularly polarized light having a rotation direction opposite to the above rotation direction. Patent Literature 1 proposes an optical layered body in which using the function of the resin having cholesteric regularity, an image visually recognized when one surface thereof is observed differs from an image visually recognized when another surface thereof is observed although the optical layered body is transparent or translucent.

When reflected light observation of the front surface of the optical layered body described in Patent Literature 1 is carried out, a layer provided on the front surface can be visually recognized. However, when the optical layered body is turned over and reflected light observation of the rear surface thereof is carried out, the layer provided on the front surface can be concealed although the optical layered body itself is transparent or translucent. Therefore, although the optical layered body is transparent or translucent, an image visually recognized when reflected light observation of the front surface is carried out can differ from an image visually recognized when reflected light observation of the rear surface is carried out. Unless otherwise specified, the "reflected light observation" means observation in which reflected light of illumination light is observed.

However, in the optical layered body described in Patent Literature 1, concealability of a layer provided on a surface opposite with respect to a surface of which reflected light observation is carried out is low. Specifically, when reflected light observation of the front surface of the optical layered body is carried out, the layer provided on the rear surface can be slightly seen. When reflected light observation of the rear surface of the optical layered body is carried out, the layer provided on the front surface can be slightly seen. When the concealability of the layer provided on the surface opposite with respect to the surface of which reflected light observation is carried out is low, an authenticity identification capability may be reduced.

The present invention has been made in view of the above-mentioned problems. An object of the present invention is to provide an optical layered body, having excellent concealability of a layer provided on a surface opposite with respect to a surface of which reflected light observation is carried out, and a method for determining authenticity thereof, and an article including the optical layered body.

Solution to Problem

The present inventor has intensively studied to solve the above-mentioned problems. As a result, the present inventor has found that the above-mentioned problems can be solved by an optical layered body including a polarized light separation layer and a first display layer, wherein the polarized light separation layer is a linear polarizer including one of an absorptive linear polarizer and a reflective linear polarizer, the first display layer is a linear polarizer including the other of the absorptive linear polarizer and the reflective linear polarizer, the first display layer overlaps with a part of the polarized light separation layer, and an average degree of polarization of the polarized light separation layer at a wavelength of 400 nm to 680 nm is within a particular range. Thus, the present invention has been completed. Specifically, the present invention includes as follows.

<1> An optical layered body comprising a polarized light separation layer and a first display layer, wherein:
the polarized light separation layer is a linear polarizer including one of an absorptive linear polarizer and a reflective linear polarizer;
the first display layer is a linear polarizer including the other of the absorptive linear polarizer and the reflective linear polarizer;
the first display layer overlaps with a part of the polarized light separation layer; and
an average degree of polarization of the polarized light separation layer at a wavelength of 400 nm to 680 nm is 0.60 or more.

<2> The optical layered body according to <1>, wherein a polarized light transmission axis of the polarized light separation layer and a polarized light transmission axis of the first display layer are in parallel to each other.

<3> The optical layered body according to <1> or <2>, wherein:
the polarized light separation layer includes an absorptive linear polarizer; and
the first display layer includes a reflective linear polarizer.

<4> The optical layered body according to <3>, wherein the reflective linear polarizer included in the first display layer is a multi-layer reflective polarizer.

<5> The optical layered body according to <3>, wherein the reflective linear polarizer included in the first display layer includes a phase difference layer and a layer containing a resin having cholesteric regularity, in this order from a side of the polarized light separation layer.

<6> The optical layered body according to <1> or <2>, wherein:
the polarized light separation layer includes a reflective linear polarizer; and the first display layer includes an absorptive linear polarizer.

<7> The optical layered body according to <6>, wherein the reflective linear polarizer included in the polarized light separation layer is a multi-layer reflective polarizer.

<8> The optical layered body according to <6>, wherein the reflective linear polarizer included in the polarized light separation layer includes a first phase difference layer, a layer containing a resin having cholesteric regularity, and a second phase difference layer, in this order.

<9> The optical layered body according to any one of <3> to <5>, comprising a second display layer including a reflective linear polarizer, the polarized light separation layer, and the first display layer, in this order.

<10> The optical layered body according to any one of <6> to <8>, comprising a second display layer including an absorptive linear polarizer, the polarized light separation layer, and the first display layer in this order.

<11> A method for determining authenticity of the optical layered body according to any one of <1> to <10>, the method comprising the steps of:

observing, from the first display layer side, reflected light of light for illuminating the first display layer side of the optical layered body to determine whether the first display layer can be visually recognized; and observing, from a side opposite with respect to the first display layer, reflected light of light for illuminating the side of the optical layered body opposite with respect to the first display layer to determine whether the first display layer can be visually recognized.

<12> A method for determining authenticity of the optical layered body according to <9> or <10>, the method comprising the steps of:

observing, from the first display layer side, reflected light of light for illuminating the first display layer side of the optical layered body to determine whether the first display layer and the second display layer can be visually recognized; and observing, from a side opposite with respect to the first display layer, reflected light of light for illuminating the side of the optical layered body opposite with respect to the first display layer to determine whether the first display layer and the second display layer can be visually recognized.

<13> An article comprising the optical layered body according to any one of <1> to <10>.

Advantageous Effects of Invention

According to the present invention, an optical layered body, having excellent concealability of a layer provided on a surface opposite with respect to a surface of which reflected light observation is carried out, and a method for determining authenticity thereof, and an article including the optical layered body can be provided.

DESCRIPTION OF EMBODIMENTS

Figure 1:
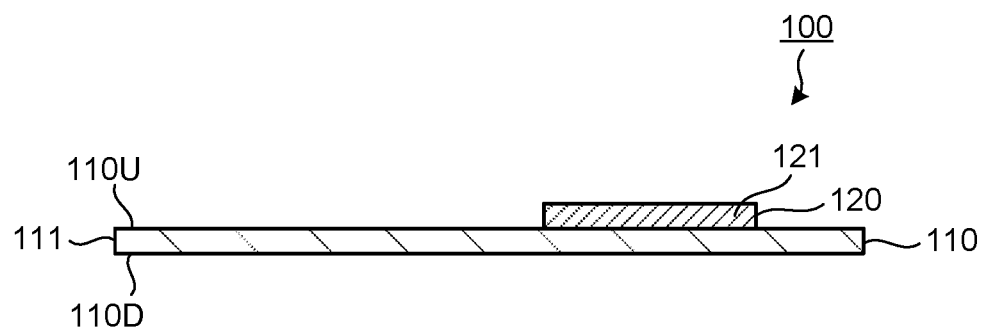
FIG. 1 is a cross-sectional view schematically illustrating an optical layered body according to a first embodiment of the present invention.

Hereinafter, the present invention will be described in detail with reference to embodiments and examples. However, the present invention is not limited to embodiments and examples described below, and may be freely modified for implementation without departing from the scope of claims of the present invention and the scope of their equivalents.

In the following description, the term "linear polarizer" refers to an optical element capable of transmitting linearly polarized light when at least one surface thereof is irradiated with unpolarized light, unless otherwise specified.

In the following description, the "polarized light transmission axis" of a linear polarizer represents the vibration direction of linearly polarized light that has been transmitted through the linear polarizer to go out thereof, unless otherwise specified.

In the following description, an in-plane retardation Re of a layer is a value represented by Re=(nx−ny)×d unless otherwise specified. Herein, nx represents a refractive index in a direction in which the maximum refractive index is given among directions (in-plane directions) perpendicular to the thickness direction of the layer, ny represents a refractive index in a direction, among the above-mentioned in-plane directions, perpendicular to the direction giving nx, and d represents the thickness of the layer. The measurement wavelength is 550 nm unless otherwise specified.

In the following description, a visible wavelength range refers to a wavelength range of 400 nm or longer and 780 nm or shorter, unless otherwise specified.

In the following description, an angle formed by an optical axes (polarized light transmission axis, slow axis, etc.) refers to an angle as seen in the thickness direction.

In the following description, the term "circularly polarized light" may include elliptically polarized light within a range in which the advantageous effects of the present invention are not significantly impaired, unless otherwise specified.

1. Outline of Optical Layered Body

An optical layered body of the present invention includes a polarized light separation layer and a first display layer. As viewed in the thickness direction, the first display layer overlaps with a part of the polarized light separation layer. In this specification, a certain layer "overlapping" with another layer means that, when a planer positional relationship between the layers is observed in the thickness direction, the layers are present at least partially at the same planar position. The polarized light separation layer is a linear polarizer including one of an absorptive linear polarizer and a reflective linear polarizer. The first display layer is a linear polarizer including the other of the absorptive linear polarizer and the reflective linear polarizer. While the absorptive linear polarizer does not reflect or slightly reflects polarized light, the reflective linear polarizer largely reflects polarized light. When reflected light observation of a surface of the optical layered body on the first display layer side is carried out, the reflection intensity of light on the polarized light separation layer differs from the reflection intensity of light on the first display layer. Therefore, the polarized light separation layer and the first display layer can be recognized discriminatingly and visually. Accordingly, an observer can visually recognize the first display layer.

In the present embodiment, linearly polarized light that has been transmitted through the polarized light separation layer can be then transmitted through the first display layer. Therefore, when reflected light observation of a surface of the optical layered body on a side opposite with respect to the first display layer is carried out, visual recognition of the first display layer can be difficult, and the concealability of the first display layer can be enhanced.

In this optical layered body, the average degree of polarization of the polarized light separation layer at a wavelength of 400 nm to 680 nm is within a particular high range. Therefore, when reflected light observation of the surface of the optical layered body on the side opposite with respect to the first display layer is carried out, the concealability of the first display layer can be enhanced.

2. First Embodiment

FIG. 1 is a cross-sectional view schematically illustrating an optical layered body 100 according to a first embodiment of the present invention.

As shown in FIG. 1, the optical layered body 100 according to the first embodiment of the present invention includes a polarized light separation layer 110 including an absorptive linear polarizer 111, and a first display layer 120 including a reflective linear polarizer 121.

Specifically, the polarized light separation layer 110 has a first surface 110U as one main surface and a second surface 110D as another main surface opposite with respect to the first surface 110U. On one of the first surface 110U and the second surface 110D, the first display layer 120 is disposed directly or indirectly. A layer disposed "directly" on a surface means that another layer is not present between the surface and the layer. A layer disposed "indirectly" on a surface means that another layer (such as an adhesion layer) is present between the surface and the layer. In the present embodiment, an example in which the first phase difference layer 120 is disposed on the first surface 110U of the polarized light separation layer 110 is shown for description.

The first display layer 120 is usually disposed on a part of the first surface 110U of the polarized light separation layer 110. As viewed in the thickness direction, a part or the entirety of the first display layer 120 is usually disposed so as to overlap with a part of the polarized light separation layer 110. Therefore, in in-plane directions perpendicular to the thickness direction of the optical layered body 100, a position of a part or the entirety of the first display layer 120 is usually the same as a position of a part of the polarized light separation layer 110. In this case, as viewed in the thickness direction, the reflective linear polarizer 121 of the first display layer 120 may overlap with a part of the polarized light separation layer 110. In the present embodiment, an example in which the entirety of the first display layer 120 overlaps with a part of the polarized light separation layer 110 as viewed in the thickness direction is shown for description.

The first display layer 120 may generally have a planer shape according to the design of the optical layered body 100. Unless otherwise specified, the "planer shape" represents a shape viewed in the thickness direction. Examples of the planer shape of the first display layer 120 may include, but are not limited to, characters, numerals, symbols, and figures.

(2.1. Polarized Light Separation Layer)

The polarized light separation layer 110 according to the present embodiment is a linear polarizer including the absorptive linear polarizer 111. When at least one surface of the absorptive linear polarizer 111 is irradiated with unpolarized light, the absorptive linear polarizer 111 can transmit linearly polarized light having a certain vibration direction, and can absorb other polarized light. When at least one surface of the polarized light separation layer 110 according to the present embodiment including the absorptive linear polarizer 111 is irradiated with unpolarized light, the polarized light separation layer 110 can transmit linearly polarized light having the certain vibration direction, and can absorb other polarized light. The vibration direction of linearly polarized light means the vibration direction of electric field of the linearly polarized light. As described above, the vibration direction of linearly polarized light that has been transmitted through the absorptive linear polarizer 111 to go out thereof may coincide with a polarized light transmission axis of the absorptive linear polarizer 111, and the vibration direction of linearly polarized light that has been transmitted through the polarized light separation layer 110 to go out thereof may coincide with a polarized light transmission axis of the polarized light separation layer 110.

The polarized light separation layer 110 has a particular high degree of polarization within a wide range in the visible wavelength range. Specifically, the average degree of polarization of the polarized light separation layer 110 at a wavelength of 400 nm to 680 nm is usually 0.60 or more, preferably 0.70 or more, more preferably 0.80 or more, and particularly preferably 0.90 or more, and is usually 1.00 or less. The polarized light separation layer 110 having the average degree of polarization within this range can usually selectively transmit linearly polarized light having a vibration direction parallel to the polarized light transmission axis over a wide range including the wavelength of 400 nm to 680 nm in the visible wavelength range. Preferably, the polarized light separation layer 110 can selectively transmit linearly polarized light having a vibration direction parallel to the polarized light transmission axis over the entirety of the visible wavelength range.

The degree of polarization P of the polarized light separation layer 110 at a certain wavelength represents the ratio of polarized light contained in transmitted light obtained when the polarized light separation layer 110 is irradiated with unpolarized light having the wavelength. Specifically, from the maximum transmittance Tmax and the minimum transmittance Tmin among the transmittance of linearly polarized light that has a vibration direction in any angular direction $\theta$ ($0° \leq \theta < 360°$) through the polarized light separation layer 110, the transmittance of elliptically polarized light that has an ellipse long-axis direction in any angular direction θ (0°≤θ<360°) through the polarized light separation layer 110, the transmittance of clockwise circularly polarized light through the polarized light separation layer 110, and the transmittance of counterclockwise circularly polarized light through the polarized light separation layer 110, the degree of polarization P is determined by "P= (Tmax−Tmin)/(Tmax+Tmin)". This degree of polarization P may be measured with a polarimeter ("AxoScan high-speed high-precision Mueller matrix polarimeter" manufactured by AXOmetrics, Inc.). Specifically, the degree of polarization P can be obtained from an output of measurement item "TOTAL POLARIZANCE" in measurement in the thickness direction (incidence angle: 0°) of the polarized light separation layer 110 with the polarimeter. As described above, the degree of polarization P is measured in a wavelength range of 400 nm to 680 nm, and an average thereof can be calculated as an average degree of polarization.

Since the polarized light separation layer 110 according to the present embodiment includes the absorptive linear polarizer 111, the polarized light separation layer 110 usually has low reflectance in the visible wavelength range. Specifically, the average reflectance of the polarized light separation layer 110 including the absorptive linear polarizer 111 in the visible wavelength range with respect to unpolarized light is usually 20% or less, preferably 10% or less, and more preferably 5% or less, and is usually 0% or more. A reflectance can be measured with an ultraviolet-visible spectrophotometer (for example, "UV-Vis 550" manufactured by JASCO Corporation).

Examples of the absorptive linear polarizer 111 may include a film obtained by adsorbing iodine or a dichroic dye to a polyvinyl alcohol film and then uniaxially stretching the film in a boric acid bath; and a film obtained by adsorbing iodine or a dichroic dye to a polyvinyl alcohol film, stretching the film, and then modifying a part of polyvinyl alcohol unit in the molecular chain into a polyvinylene unit. Among these, an absorptive linear polarizer containing polyvinyl alcohol is preferable.

The polarized light separation layer 110 may include an optional layer (not shown) in combination with the absorptive linear polarizer 111 within a range in which the advantageous effects of the present invention are not significantly impaired. Examples of the optional layer may include a support layer that supports the absorptive linear polarizer 111, and an adhesion layer (including a tackiness layer) that bonds the absorptive linear polarizer 111 to another layer. These optional layers preferably have a low in-plane retardation. Specifically, the in-plane retardation of the optional layers is preferably 20 nm or less, more preferably 10 nm or less, particularly preferably 5 nm or less, and ideally 0 nm. Since a layer having such a small in-plane retardation is a layer having optical isotropy, a change in a polarization state by the optional layer can be suppressed. It is preferable that the polarized light separation layer 110 according to the present invention includes only the absorptive linear polarizer 111.

The thickness of the polarized light separation layer 110 is preferably 10 μm or more, more preferably 20 μm or more, and particularly preferably 30 μm or more, and is preferably 500 μm or less, more preferably 300 μm or less, and particularly preferably 200 μm or less.

(2.2. First Display Layer)

The first display layer 120 according to the present embodiment is a linear polarizer including the reflective linear polarizer 121. When at least one surface of the reflective linear polarizer 121 is irradiated with unpolarized light, the reflective linear polarizer 121 can transmit linearly polarized light having a certain vibration direction, and can reflect other polarized light. Therefore, when at least one surface of the first display layer 120 according to the present embodiment including the reflective linear polarizer 121 is irradiated with unpolarized light, the first display layer 120 can also transmit linearly polarized light having the certain vibration direction, and can reflect other polarized light. As described above, the vibration direction of linearly polarized light that has been transmitted through the reflective linear polarizer 121 to go out thereof may coincide with a polarized light transmission axis of the reflective linear polarizer 121, and the vibration direction of linearly polarized light that has been transmitted through the first display layer 120 to go out thereof may coincide with a polarized light transmission axis of the first display layer 120.

The polarized light transmission axis of the first display layer 120 is set such that linearly polarized light that has been transmitted through the polarized light separation layer 110 can be transmitted through the first display layer 120. Thus, the polarized light transmission axis of the first display layer 120 and the polarized light transmission axis of the polarized light separation layer 110 are usually set parallel to each other. Therefore, the polarized light transmission axis of the absorptive linear polarizer 111 included in the polarized light separation layer 110 and the polarized light transmission axis of the reflective linear polarizer 121 included in the first display layer 120 are usually set parallel to each other. This parallelism may include an error within a range where the concealability of the first display layer 120 can be enhanced. The range of an angle formed between the polarized light transmission axis of the polarized light separation layer 110 and the polarized light transmission axis of the first display layer 120 is usually 0° to 10°, more preferably 0° to 5°, and particularly preferably 0° to 3°. The range of the angle formed between the polarized light transmission axis of the absorptive linear polarizer 111 and the polarized light transmission axis of the reflective linear polarizer 121 may also be within the same range as described above.

Since the first display layer 120 according to the present embodiment includes the reflective linear polarizer 121, the first display layer 120 can usually reflect a part of polarized light when the first display layer 120 is irradiated with unpolarized light. Polarized light thus reflected by the first display layer 120 can be visually recognized by the observer. From the viewpoint of achieving a display mode capable of being viewed with the naked eye, the wavelength range in which the first display layer 120 according to the present embodiment including the reflective linear polarizer 121 can reflect polarized light is preferably within the visible wavelength region. In the following description, the wavelength range in which the first display layer 120 can reflect polarized light may be referred to as a "first reflection wavelength range". The first display layer 120 may have a reflectance of usually 40% or more, and preferably 45% or more, and usually 50% or less with respect to unpolarized light at the above-mentioned first reflection wavelength range in which polarized light can be reflected.

It is preferable that a specific wavelength range in which the first display layer 120 can reflect polarized light is set according to the design of the optical layered body 100. In an example, the wavelength width of the first reflection wavelength range in which the first display layer 120 can reflect polarized light is preferably 70 nm or more, more preferably 100 nm or more, further preferably 200 nm or more, and particularly preferably 400 nm or more, and is preferably 600 nm or less.

Examples of the reflective linear polarizer 121 may include a multi-layer reflective polarizer. The multi-layer reflective polarizer is a reflective linear polarizer including a plurality of layers having different refractive index anisotropy in in-plane directions perpendicular to the thickness direction. Examples thereof may include those described in Japanese Translation of PCT Patent Application Publication No. Hei. 9-507308 A and Michael F. Weber, Carl A. Stover, Larry R. Gilbert, Timothy, J. Nevitt, Andrew J. Ouderkirk, "Giant Birefringent Optics in Multilayer Polymer Mirrors", SCIENCE vol. 287, 31 Mar. 2000, pp. 2451 to 2456.

The multi-layer reflective polarizer usually includes a plurality of layers A having refractive index anisotropy and a plurality of layers B having refractive index anisotropy different from that of the layers A, where the layers A and B are alternately arranged in the thickness direction. In one direction X perpendicular to the thickness direction, the refractive index of the layers A is different from the refractive index of the layers B. In a direction Y perpendicular to both the thickness direction and the direction X, the refractive index of the layers A is the same as the refractive index of the layers B. The multi-layer reflective polarizer including the layers A and the layers B that are alternately arranged can reflect linearly polarized light having a vibration direction in the direction X and can transmit linearly polarized light having a vibration direction in the direction Y. The wavelength of linearly polarized light reflected by the multi-layer reflective polarizer can be adjusted by the thicknesses of the layers A and the layers B. As such a multi-layer reflective polarizer, a commercially available product may be used. For example, "DBEF" manufactured by 3M Company can be used.

Additional examples of the reflective linear polarizer 121 may include a wire grid polarizer. The wire grid polarizer is a reflective linear polarizer including a plurality of wires arranged in parallel. The above-mentioned wires are generally formed of a metal. The wire grid polarizer usually includes a plurality of metal wires arranged in parallel at a constant pitch. The wire grid polarizer can reflect linearly polarized light having a vibration direction parallel to the longitudinal direction of the wires, and can transmit linearly polarized light having a vibration direction perpendicular to the longitudinal direction. The wavelength of linearly polarized light reflected by the wire grid polarizer can be adjusted by the pitch of the wires. As such a wire grid polarizer, a commercially available product may be used. For example, "wire grid polarizing film" available from Edmund Optics Inc., may be used.

Yet another example of the reflective linear polarizer 121 is a polarizer including a combination of a phase difference layer and a layer containing a resin having cholesteric regularity. This polarizer may include a phase difference layer (first phase difference layer), a layer containing a resin having cholesteric regularity, and another phase difference layer (second phase difference layer), in this order in the thickness direction. Hereinafter, the resin having cholesteric regularity may be referred to as a "cholesteric resin" as appropriate. Since the cholesteric resin is usually formed in a layer shape, the layer containing a cholesteric resin may contain a layer of the cholesteric resin.

A cholesteric resin can generally exhibit a circularly polarized light separation function. Therefore, a layer containing a cholesteric resin can reflect circularly polarized light having one rotation direction and transmit circularly polarized light having a rotation direction opposite to the one rotation direction. The circularly polarized light having been transmitted through the layer containing the cholesteric resin is converted into linearly polarized light by transmission through the phase difference layer, so that a reflective linear polarizer can be obtained by combining the phase difference layer and the layer containing the cholesteric resin.

The cholesteric regularity is a structure in which the angle of molecular axes in stacking planes are shifted (twisted) as the planes are observed sequentially passing through the stacked planes, such that molecular axes in a certain first plane are oriented in a certain direction, molecular axes in a subsequent plane stacking on the first plane are oriented in a direction shifted by a small angle with respected to that of the first plane, and molecular axes in still another plane are oriented in a direction of a further shifted angle. That is, when molecules inside a layer have cholesteric regularity, molecular axes of the molecules on a first plane inside the layer are aligned along a constant direction. On the subsequent second plane stacking on the first plane inside the layer, a direction of molecular axes is shifted by a slight angle from the direction of the molecular axes on the first plane. On the subsequent third plane further stacking on the second plane, a direction of molecular axes is further shifted by an angle from the direction of the molecular axes on the second plane. In this manner, on the planes disposed in a stacking manner, the angles of the molecular axes on these planes are sequentially shifted (twisted). The structure in which the directions of the molecular axes are twisted in this manner is usually a helical structure and is an optically chiral structure.

The cholesteric resin can generally exhibit the circularly polarized light separation function as described above. The "circularly polarized light separation function" means a function of reflecting circularly polarized light having either a clockwise rotation direction or a counterclockwise rotation direction and transmitting circularly polarized light having the other rotating direction. In reflection in the cholesteric resin, circularly polarized light is usually reflected while chirality thereof is maintained. In general, the layer containing the cholesteric resin contained in the reflective linear polarizer 121 of the first display layer 120 can reflect circularly polarized light having one rotation direction in the first reflection wavelength range, and can transmit circularly polarized light having a rotation direction opposite to the one rotation direction.

A specific wavelength at which the cholesteric resin exhibits the circularly polarized light separation function generally depends on the pitch of the helical structure in the cholesteric resin. The pitch of the helical structure is a distance in a plane normal direction, from the start of gradual shifting of the direction of molecular axes with an angle in the helical structure as proceeding through planes, to the return to the original direction of molecular axes. By changing the size of the pitch of the helical structure, the wavelength at which the circularly polarized light separation function is exhibited can be changed. For example, a method described in Japanese Patent Application Laid-Open No. 2009-300662 A may be used as a method for adjusting a pitch. Specific examples of the method may include a method in which the type of the chiral agent is adjusted or the amount of the chiral agent is adjusted in a cholesteric liquid crystal composition. In particular, when the size of pitch of the helical structure inside the layer is continuously changed, the circularly polarized light separation function over a wide wavelength range can be obtained by a single layer of the cholesteric resin.

Examples of a layer of the cholesteric resin that can exhibit the circularly polarized light separation function in a wide wavelength range may include (i) a layer of the cholesteric resin in which the size of pitch of the helical structure is changed in a stepwise manner and (ii) a layer of the cholesteric resin in which the size of pitch of the helical structure is continuously changed.

(i) The layer of the cholesteric resin in which the pitch of the helical structure is changed in a stepwise manner can be obtained, for example, by layering a plurality of layers of the cholesteric resin having different pitches of the helical structure. The layering can be performed by previously preparing a plurality of layers of the cholesteric resin having different pitches of the helical structure and then bonding the layers via a tackiness agent or an adhesive. Alternatively, the layering can be performed by forming a certain layer of a cholesteric resin and then sequentially forming other layers of a cholesteric resin on the certain cholesteric resin layer.

(ii) The layer of the cholesteric resin in which the size of pitch of the helical structure is continuously changed may be obtained, for example, by subjecting a layer of a liquid crystal composition to a band broadening treatment including an irradiation treatment with an active energy ray and/or a warming treatment, once or more times, and then curing the resulting layer of the liquid crystal composition. According to the band broadening treatment described above, the pitch of the helical structure can be continuously changed in the thickness direction. The wavelength range (reflection band) in which the layer of the cholesteric resin can exhibit the circularly polarized light separation function can thus be enlarged. Accordingly, the treatment is called as a band broadening treatment.

The layer of the cholesteric resin may be a layer of a single-layer structure including only one layer or a layer of a multiple-layered structure including two or more layers. The number of layers included in the layer of the cholesteric resin is preferably 1 to 100, and more preferably 1 to 20, from the viewpoint of easy production.

Although there is no limitation on the method for producing the layer containing the cholesteric resin, the layer can be generally produced using a cholesteric liquid crystal composition. The cholesteric liquid crystal composition refers to a composition capable of exhibiting a liquid crystal phase (cholesteric liquid crystal phase) in which a liquid crystal compound has cholesteric regularity when the liquid crystal compound contained in the liquid crystal composition is oriented. A material referred to herein as a "liquid crystal composition" for convenience includes not only a mixture of two or more substances, but also a material composed of a single substance. The layer containing a cholesteric resin can be obtained, for example, as a layer of a cholesteric resin by forming a film of a cholesteric liquid crystal composition on a suitable support and curing the film of the cholesteric liquid crystal composition. Specific examples of the method for producing the layer of the cholesteric resin may include methods described in Japanese Patent Application Laid-Open No. 2014-174471 A and Japanese Patent Application Laid-Open No. 2015-27743 A. In the production method using such a cholesteric liquid crystal composition, the twisting direction in the cholesteric regularity can be appropriately selected depending on the structure of a chiral agent contained in the liquid crystal composition. For example, when the twisting direction is to be a clockwise direction, a cholesteric liquid crystal composition containing a chiral agent for imparting dextrorotation may be used, and when the twisting direction is to be a counterclockwise direction, a cholesteric liquid crystal composition containing a chiral agent for imparting levorotation may be used.

The layer containing a cholesteric resin may be a layer containing flakes of the cholesteric resin. The flake of the cholesteric resin can be used as a pigment containing a minute layer of the cholesteric resin. Therefore, the layer containing the flakes of the cholesteric resin can exhibit the circularly polarized light separation function in the same manner as the layer itself of the cholesteric resin. Thus, the layer containing the flakes of the cholesteric resin can be easily formed into a free shape by a coating method such as a printing method.

The particle diameter of the flakes of the cholesteric resin is preferably 1 μm or more in order to obtain decorativeness. In particular, it is desirable that the particle diameter of the flakes is equal to or larger than the thickness of the layer containing the flakes. In this case, it is easy to orient respective flakes so that the main surface of the flakes and the layer plane of the layer containing the flakes become in parallel to each other or form an acute angle. Therefore, since the flakes can effectively receive light, the circularly polarized light separation function of the layer containing the flakes can be enhanced. The upper limit of the particle diameter of the flakes is preferably 500 μm or less, and more preferably 100 μm or less, from the viewpoint of obtaining formability and printability. Herein, the particle diameter of a flake refers to a diameter of a circle having the same area as that of the flake.

As the flakes of the cholesteric resin, for example, crushed pieces of the above-described layer of the cholesteric resin may be used. Such flakes may be produced, for example, by the production method described in Japanese Patent No. 6142714.

The layer containing the flakes of the cholesteric resin may contain an optional component in combination with the above-mentioned flakes. The optional component may include a binder for binding the flakes. Examples of the binder may include polymers such as a polyester-based polymer, an acrylic-based polymer, a polystyrene-based polymer, a polyamide-based polymer, a polyurethane-based polymer, a polyolefin-based polymer, a polycarbonate-based polymer, and a polyvinyl-based polymer. The amount of the binder is preferably 20 parts by weight or more, more preferably 40 parts by weight or more, and particularly preferably 60 parts by weight or more, and is preferably 1,000 parts by weight or less, more preferably 800 parts by weight or less, and particularly preferably 600 parts by weight or less, relative to 100 parts by weight of the flakes.

The layer containing the flakes of the cholesteric resin may be produced, for example, by applying an ink containing the flakes, a solvent, and as necessary, an optional component, and drying the ink. As the solvent, an inorganic solvent such as water may be used, and an organic solvent such as a ketone solvent, an alkyl halide solvent, an amide solvent, a sulfoxide solvent, a heterocyclic compound, a hydrocarbon solvent, an ester solvent, or an ether solvent may be used. The amount of the solvent is preferably 40 parts by weight or more, more preferably 60 parts by weight or more, and particularly preferably 80 parts by weight or more, and is preferably 1,000 parts by weight or less, more preferably 800 parts by weight or less, and particularly preferably 600 parts by weight or less, relative to 100 parts by weight of the flakes.

The above-mentioned ink may contain monomers of the polymer instead of or in combination with the polymer as a binder. In this case, the layer containing the flakes of the cholesteric resin may be formed by applying and drying an ink, and then polymerizing the monomers. When containing the monomers, the ink preferably contains a polymerization initiator.

The phase difference layer has refractive index anisotropy. The polarization state of circularly polarized light that has been transmitted through the layer containing the cholesteric resin can thus be changed to linearly polarized light by transmission through the phase difference layer. Therefore, a reflective linear polarizer can be obtained by combining the phase difference layer and the layer containing the cholesteric resin. For example, in the polarizer including the phase difference layer and the layer containing the cholesteric resin, the layer containing the cholesteric resin can reflect polarized light. Furthermore, linearly polarized light can be obtained as light that is transmitted through the layer containing the cholesteric resin and the phase difference layer in this order.

It is preferable that the in-plane retardation of the phase difference layer is set to a range where the concealability of the first display layer 120 can be enhanced. Specifically, it is preferable that the phase difference layer has an in-plane retardation of ¼ wavelength. The in-plane retardation of ¼ wavelength at a measurement wavelength of 550 nm is preferably 110 nm or more, more preferably 120 nm or more, and particularly preferably 125 nm or more, and is preferably 165 nm or less, more preferably 155 nm or less, and particularly preferably 150 nm or less. The reflective linear polarizer including the phase difference layer having the in-plane retardation of ¼ wavelength in combination with the layer containing the cholesteric resin can effectively enhance the concealability of the first display layer 120 when the reflective linear polarizer is used as the first display layer 120.

It is preferable that the phase difference layer has reverse wavelength dispersion. The reverse wavelength dispersion means that in-plane retardations Re(450) and Re(550) at measurement wavelengths of 450 nm and 550 nm satisfy the following expression (R1). In particular, it is preferable that in-plane retardations Re(450), Re(550), and Re(650) of the phase difference layer at measurement wavelengths of 450 nm, 550 nm, and 650 nm satisfy the following expression (R2).

$$Re(450) < Re(550) \tag{R1}$$

$$Re(450) < Re(550) < Re(650) \tag{R2}$$

The polarizer including a combination of the phase difference layer and the layer containing the cholesteric resin is usually disposed such that the phase difference layer is positioned between the polarized light separation layer 110 and the layer containing the cholesteric resin. Therefore, the above-mentioned polarizer may be disposed such that the phase difference layer and the layer containing the cholesteric resin are arranged in this order from the polarized light separation layer 110 side in the thickness direction. In this case, the phase difference layer preferably has a slow axis forming an angle within a particular range with respect to the polarized light transmission axis of the polarized light separation layer 110. This slow axis of the phase difference layer preferably forms an angle within the same particular range with respect to the polarized light transmission axis of the absorptive linear polarizer 111 included in the polarized light separation layer 110. Specifically, this particular range preferably falls within the range of 45°±5°. More specifically, the above-mentioned particular range is preferably 40° or more, more preferably 42° or more, and particularly preferably 43° or more, and is preferably 50° or less, more preferably 48° or less, and particularly preferably 47° or less. In the optical layered body 100 including such a reflective linear polarizer including a phase difference layer, the concealability of the first display layer 120 can be effectively enhanced when reflected light observation of the surface (the second surface 110D) opposite with respect to the first display layer 120 is carried out.

Examples of the phase difference layer may include a stretched film. A stretched film refers to a film obtained by stretching a resin film, and a desired in-plane retardation can be obtained by appropriately adjusting factors such as the type of resin, stretching conditions, and thickness. A thermoplastic resin is usually used as the resin. The thermoplastic resin may contain a polymer and, as necessary, an optional component. Examples of the polymer may include a polycarbonate, a polyethersulfone, a polyethylene terephthalate, a polyimide, a polymethyl methacrylate, a polysulfone, a polyarylate, a polyethylene, a polyphenylene ether, a polystyrene, a polyvinyl chloride, cellulose diacetate, cellulose triacetate, and an alicyclic structure-containing polymer. As the polymer, one type thereof may be solely used, and two or more types thereof may be used in combination at any ratio. Among these, an alicyclic structure-containing polymer is preferable from the viewpoint of transparency, low hygroscopicity, size stability, and processability. The alicyclic structure-containing polymer refers to a polymer having an alicyclic structure in its main chain and/or side chains, and for example, those described in Japanese Patent Application Laid-Open No. 2007-057971 A may be used.

The stretched film as the phase difference layer can be produced by producing a resin film from the above-mentioned resin, and then stretching the resin film. Specific examples of the method for producing the phase difference layer as a stretched film may include the method described in International Publication No. 2019/059067.

Additional examples of the phase difference layer may include a liquid crystal cured layer. A liquid crystal cured layer refers to a layer formed of a cured product of a liquid crystal composition containing a liquid crystal compound. Generally, a liquid crystal cured layer can be obtained by forming a layer of a liquid crystal composition, orienting molecules of a liquid crystal compound contained in the layer of the liquid crystal composition, and then curing the layer of the liquid crystal composition. This liquid crystal cured layer can exhibit a desired in-plane retardation by appropriately adjusting factors such as the type of liquid crystal compound, the orientation state of the liquid crystal compound, and the thickness of the layer.

Although the type of the liquid crystal compound is not limited, when it is desired to obtain the phase difference layer having reverse wavelength dispersion, a liquid crystal compound having reverse wavelength dispersion is preferably used. A liquid crystal compound having reverse wavelength dispersion refers to a liquid crystal compound that exhibits a reverse wavelength dispersion property when homogeneously oriented. Homogeneous orientation of the liquid crystal compound means that a layer containing the liquid crystal compound is formed, and the directions in which the maximum refractive index in the refractive index ellipsoid of the molecules of the liquid crystal compound in the layer is given are oriented in one certain direction parallel with the plane of the layer. Specific examples of the liquid crystal compound having reverse wavelength dispersion may include compounds described in International Publication No. 2014/069515 and International Publication No. 2015/064581.

The first display layer 120 may include an optional layer (not shown) in combination with the reflective linear polarizer 121 within a range in which the advantageous effects of the present invention are not significantly impaired. Examples of the optional layer may include a support layer supporting the reflective linear polarizer 121, and an adhesion layer (including a tackiness layer) for adhesion of the reflective linear polarizer 121 to another layer. It is preferable that the optional layer has a small in-plane retardation. The specific in-plane retardation range of the optional layer may be the same range as that of the in-plane retardation of the optional layer that the polarized light separation layer 110 may include. However, the first display layer 120 according to the present embodiment preferably includes only the reflective linear polarizer 121.

The thickness of the first display layer 120 is preferably 10 µm or more, more preferably 30 µm or more, and particularly preferably 50 µm or more, and is preferably 500 µm or less, more preferably 300 µm or less, and particularly preferably 100 µm or less.

(2.3. Visibility of First Display Layer)

Figure 2:
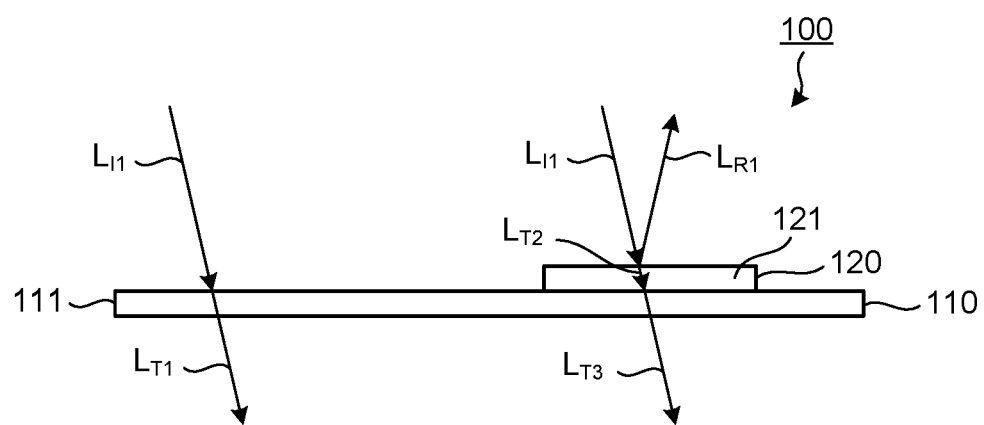
FIG. 2 is a cross-sectional view schematically illustrating the optical layered body according to the first embodiment of the present invention.
Figure 3:
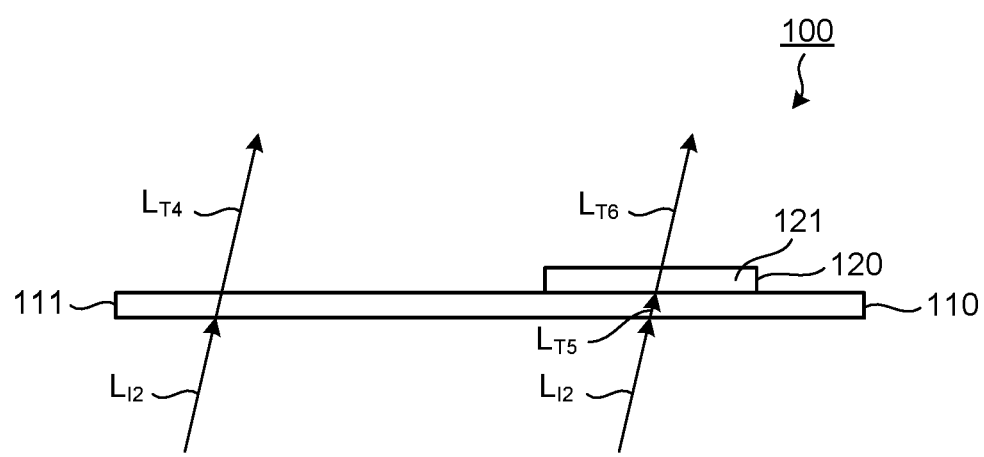
FIG. 3 is a cross-sectional view schematically illustrating the optical layered body according to the first embodiment of the present invention.

FIGS. 2 and 3 are cross-sectional views schematically illustrating the optical layered body 100 according to the first embodiment of the present invention. FIGS. 2 and 3 schematically show paths of light reflected by the polarized light separation layer 110 and the first display layer 120. Although an actual optical layered body 100 may cause various light absorptions and reflections other than those described later, main paths of light will be schematically described in the following description for convenience of description of actions.

FIG. 2 shows a case where the first display layer 120 side of the optical layered body 100 is irradiated with illumination light $L_{I1}$ such as unpolarized light containing both linearly polarized light having a certain vibration direction and linearly polarized light having a vibration direction perpendicular to the certain vibration direction. As shown in FIG. 2, at an area where the first display layer 120 is not disposed, the illumination light $L_{I1}$ enters the polarized light separation layer 110. A part of the polarized light contained in the illumination light $L_{I1}$ is absorbed by the polarized light separation layer 110 including the absorptive linear polarizer 111. Polarized light $L_{T1}$ other than the absorbed polarized light is transmitted through the polarized light separation layer 110 and goes out of the optical layered body 100.

As shown in FIG. 2, at the area where the first display layer 120 is disposed, the first display layer 120 and the polarized light separation layer 110 are arranged in this order. Thus, the illumination light $L_{I1}$ enters the first display layer 120. A part of the polarized light $L_{R1}$ contained in the illumination light $L_{I1}$ is reflected by the first display layer 120 including the reflective linear polarizer 121. Light $L_{T2}$ other than the reflected polarized light $L_{R1}$ enters the polarized light separation layer 110. A part of the polarized light contained in the entering light $L_{T2}$ may be absorbed by the polarized light separation layer 110 including the absorptive linear polarizer 111. Polarized light $L_{T3}$ other than the absorbed polarized light is transmitted through the polarized light separation layer 110 and goes out of the optical layered body 100.

Thus, when the first display layer 120 side of the optical layered body 100 is irradiated with the illumination light $L_{I1}$, the polarized light $L_{R1}$ can be reflected by the first display layer 120. When reflected light observation of the first display layer 120 side is carried out under irradiation with the illumination light $L_{I1}$, light with strong intensity is reflected by the first display layer 120. An observer can visually recognize the polarized light $L_{R1}$ that has been reflected by the first display layer 120. Therefore, the observer who performs reflected light observation of the first display layer 120 side of the optical layered body 100 can visually recognize the first display layer 120.

Although not shown in FIG. 2, at an area where the first display layer 120 is not disposed, a part of the illumination light $L_{I1}$ may be reflected by the polarized light separation layer 110 to obtain reflected light. Even in this case, the intensity of the reflected light described above is usually sufficiently weaker than the polarized light $L_{R1}$ reflected by the first display layer 120. Therefore, even in this case, the first display layer 120 can be visually recognized as a portion having stronger reflection than the surroundings.

On the other hand, FIG. 3 illustrates a case where the optical layered body 100 is irradiated with illumination light $L_{I2}$ such as unpolarized light containing both linearly polarized light having a certain vibration direction and linearly polarized light having a vibration direction perpendicular to the certain vibration direction, on the side opposite with respect to the first display layer 120. As illustrated in FIG. 3, at an area where the first display layer 120 is not disposed, the illumination light $L_{I2}$ enters the polarized light separation layer 110. A part of the polarized light contained in the illumination light $L_{I2}$ is absorbed by the polarized light separation layer 110 including the absorptive linear polarizer 111. Polarized light $L_{T4}$ other than the absorbed polarized light is transmitted through the polarized light separation layer 110 and goes out of the optical layered body 100. Usually, the polarized light $L_{T4}$ that has been transmitted through the polarized light separation layer 110 is linearly polarized light having a vibration direction parallel to the polarized light transmission axis of the polarized light separation layer 110.

As shown in FIG. 3, at the area where the first display layer 120 is disposed, as at the area where the first display layer 120 is not disposed, a part of the polarized light contained in the irradiation light $L_{I2}$ is absorbed by the absorptive linear polarizer 111 included in the polarized light separation layer 110 while polarized light $L_{T5}$ other than the absorbed polarized light is transmitted through the polarized light separation layer 110. The polarized light $L_{T5}$ that has been transmitted through the polarized light separation layer 110 then enters the first display layer 120. The polarized light $L_{T5}$ that has entered the first display layer 120 is linearly polarized light that can be transmitted through the reflective linear polarizer 121 included in the first display layer 120. Therefore, the entirety or most of the polarized light $L_{T5}$ that has entered the first display layer 120 is not reflected by the first display layer 120. Therefore, the light $L_{T6}$ as the entirety or most of the polarized light $L_{T5}$ is transmitted through the first display layer 120 and goes out of the optical layered body 100.

Thus, when the side of the optical layered body 100 opposite with respect to the first display layer 120 is irradiated with the illumination light $L_{I2}$, the light is not reflected by the first display layer 120 or is slightly reflected.

When reflected light observation of the side opposite with respect to the first display layer 120 is carried out under irradiation with the illumination light $L_{l2}$, the observer cannot visually recognize light reflected by the first display layer 120. Therefore, the observer who performs reflected light observation of the side of the optical layered body 100 opposite with respect to the first display layer 120 cannot visually recognize the first display layer 120.

When the first display layer 120 side of the optical layered body 100 is irradiated or the side of the optical layered body 100 opposite with respect to the first display layer 120 is irradiated, light can be partially transmitted through the optical layered body 100, as described above. Therefore, the optical layered body 100 can be visually recognized to be a transparent or translucent member. Accordingly, another member can be usually observed through the optical layered body 100. The transparency of the optical layered body 100 is preferably a degree in which, through the optical layered body 100 that is placed on a plane on which a character or a picture is printed, the character or picture printed on the plane is visually recognizable. When the optical layered body 100 is transparent or translucent, the transmittance of unpolarized light that has entered the optical layered body 100 may be preferably 20% or more, and more preferably 40% or more. The upper limit of the transmittance is not limited, and for example, may be 90% or less, and usually 50% or less.

Therefore, although the optical layered body 100 is transparent or translucent, the first display layer 120 can be visually recognized when reflected light observation of the first display layer 120 side is carried out, but the first display layer 120 cannot be visually recognized when reflected light observation of the side opposite with respect to the first display layer 120 is carried out. Although the optical layered body 100 is transparent or translucent, the optical layered body 100 can thus achieve a specific display mode in which an image of the optical layered body visually recognized when observed from a front surface differs from an image of the optical layered body visually recognized when observed from a rear surface.

In the present embodiment, the polarized light separation layer 110 has a high average degree of polarization. Therefore, when the side of the optical layered body 100 opposite with respect to the first display layer 120 is irradiated with illumination light, the concealability of the first display layer 120 can be enhanced. Specifically, as illustrated in FIG. 3, the polarized light separation layer 110 having a high degree of polarization can effectively shield linearly polarized light having a vibration direction non-parallel to the polarized light transmission axis of the first display layer 120. Accordingly, when reflected light observation of the side of the optical layered body 100 opposite with respect to the first display layer 120 is carried out under irradiation with the illumination light, reflection of light by the first display layer 120 can be effectively suppressed, and thus, the concealability of the first display layer 120 can be enhanced. Since the concealability of the first display layer 120 is high, a difference between the image of the optical layered body visually recognized when observed from the front surface and the image of the optical layered body visually recognized when observed from the rear surface can be obvious, and determination of authenticity as described below can be easily performed.

When the optical layered body 100 is set in a direction in which the first display layer 120 and the polarized light separation layer 110 are arranged in this order from the observer side, the observer can usually see the first display layer 120 side of the optical layered body 100. When the optical layered body 100 is set in a direction in which the first display layer 120 and the polarized light separation layer 110 are arranged in this order from a side opposite with respect to the observer side, the observer can usually see the side of the optical layered body 100 opposite with respect to the first display layer 120. In the optical layered body 100 described above, an image in a direction in which the observer can see the first display layer 120 side can be visually recognized to be different from an image in a direction in which the observer can see the side opposite with respect to the first display layer 120 as described above. By using a difference between images visually recognized according to the directions of the optical layered body 100, a novel display mode that has not been conventionally achieved can be achieved, and a complex design with an increased latitude can be created. Although the optical layered body 100 is transparent or translucent, a difference between images is made according to the directions of the optical layered body 100 in an environment under unpolarized light such as natural light as described above. This difference can achieve unexpected display for an ordinary observer, and therefore giving a great impact to the observer can be expected.

(2.4. Method for Determining Authenticity)

The optical layered body 100 described above can be used for determination of authenticity using polarized light. For example, when the surface thereof on the first display layer side is observed through a linear polarizer plate, visibility of the first display layer can be changed depending on a direction of a polarized light transmission axis of the linear polarizer plate. Therefore, the authenticity of the optical layered body 100 can be determined by observation using a viewer including the linear polarizer plate.

However, it is often difficult for ordinary users to acquire the viewer. Therefore, it is difficult for the ordinary users to determine authenticity, and the determination of authenticity is performed only by users such as an original manufacturer, a certain retail store, and a public institution. It is thus preferable that the determination of authenticity of the optical layered body 100 is performed without using the viewer.

For example, the authenticity of the optical layered body 100 can be determined by a determination method including:
a first step of observing, from the first display layer 120 side, reflected light of light for illuminating the first display layer 120 side of the optical layered body 100 to determine whether the first display layer 120 can be visually recognized; and
a second step of observing, from the side opposite with respect to the first display layer 120, reflected light of light for illuminating the side of the optical layered body 100 opposite with respect to the first display layer 120 to determine whether the first display layer 120 can be visually recognized.

In the first step of the above-mentioned determination method, the first display layer 120 side of the optical layered body 100 is irradiated with light such as unpolarized light containing both linearly polarized light having a certain vibration direction and linearly polarized light having a vibration direction perpendicular to the certain vibration direction. The optical layered body 100 is then observed from the first display layer 120 side to determine whether the first display layer 120 can be visually recognized. When the optical layered body 100 is authentic, the first display layer 120 can be visually recognized.

In the second step of the above-mentioned determination method, the side of the optical layered body 100 opposite with respect to the first display layer 120 is irradiated with light such as unpolarized light containing both linearly polarized light having a certain vibration direction and linearly polarized light having a vibration direction perpendicular to the certain vibration direction. The optical layered body 100 is then observed from the side opposite with respect to the first display layer 120 to determine whether the first display layer 120 can be visually recognized. When the optical layered body 100 is authentic, the first display layer 120 cannot be visually recognized.

Therefore, in a case where the first display layer 120 can be visually recognized in the first step and the first display layer 120 cannot be visually recognized in the second step, the optical layered body 100 can be determined to be authentic. In other cases, the optical layered body 100 can be determined to be inauthentic. As described above, the simple method without using a viewer can determine the authenticity of the optical layered body 100 according to the present embodiment described above.

3. Second Embodiment

Figure 4:
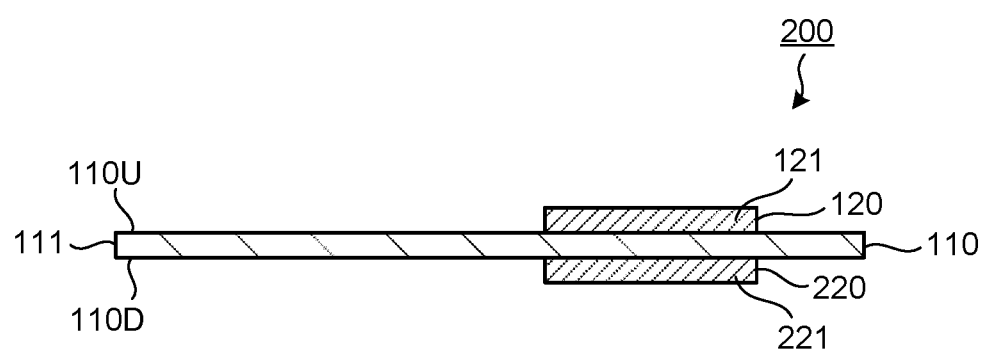
FIG. 4 is a cross-sectional view schematically illustrating an optical layered body according to a second embodiment of the present invention.

FIG. 4 is a cross-sectional view schematically illustrating an optical layered body 200 according to a second embodiment of the present invention.

As shown in FIG. 4, the optical layered body 200 according to the second embodiment of the present invention includes a second display layer 220, the polarized light separation layer 110, and the first display layer 120, in this order in the thickness direction. The optical layered body 200 is configured in the same manner as the optical layered body 100 according to the first embodiment, except that the optical layered body 200 further includes the second display layer 220 in combination with the polarized light separation layer 110 and the first display layer 120. Therefore, the polarized light separation layer 110 and the first display layer 120 included in the optical layered body 200 may be the same as those included in the optical layered body 100 according to the first embodiment, and thus the same advantageous effects as those described in the first embodiment can be obtained.

(3.1. Second Display Layer)

The second display layer 220 is a linear polarizer including a reflective linear polarizer 221, and is disposed directly or indirectly on the surface of the polarized light separation layer 110 opposite with respect to the first display layer 120. In the present embodiment, an example in which the second display layer 220 is disposed on the second surface 110D of the polarized light separation layer 110 will be described. Accordingly, the optical layered body 200 includes the second display layer 220, the polarized light separation layer 110, and the first display layer 120, in this order in the thickness direction.

The second display layer 220 may be disposed in the same manner as the first display layer 120, except that the second display layer 220 is disposed on the surface of the polarized light separation layer 110 opposite with respect to the first display layer 120. With such a second display layer 220, the same advantages as those of the first display layer 120 can be obtained.

Therefore, the second display layer 220 is usually disposed on a part of the second surface 110D of the polarized light separation layer 110. Thus, a part or the entirety of the second display layer 220 is disposed so as to overlap with a part of the polarized light separation layer 110 as viewed in the thickness direction. In this case, the reflective linear polarizer 221 of the second display layer 220 may overlap with a part of the polarized light separation layer 110 as viewed in the thickness direction. In the present embodiment, the entirety of the second display layer 220 overlaps with a part of the polarized light separation layer 110 as viewed in the thickness direction. The factors such as the size, shape, position, and number of the second display layer 220 may be different from those of the first display layer 120.

The second display layer 220 according to the present embodiment includes the reflective linear polarizer 221. When at least one surface of the reflective linear polarizer 221 is irradiated with unpolarized light, the reflective linear polarizer 221 can transmit linearly polarized light having a certain vibration direction, and can reflect other polarized light. Therefore, when at least one surface of the second display layer 220 according to the present embodiment including the reflective linear polarizer 221 is irradiated with unpolarized light, the second display layer 220 can also transmit linearly polarized light having the certain vibration direction, and can reflect other polarized light. As described above, the vibration direction of the linearly polarized light that has been transmitted through the reflective linear polarizer 221 to go out thereof may coincide with the polarized light transmission axis of the reflective linear polarizer 221, and the vibration direction of the linearly polarized light that has been transmitted through the second display layer 220 to go out thereof may coincide with the polarized light transmission axis of the second display layer 220.

The polarized light transmission axis of the second display layer 220 is set so that the linearly polarized light that has been transmitted through the polarized light separation layer 110 can be transmitted through the second display layer 220. The polarized light transmission axis of the second display layer 220 and the polarized light transmission axis of the polarized light separation layer 110 are thus usually set parallel to each other. Therefore, the polarized light transmission axis of the absorptive linear polarizer 111 included in the polarized light separation layer 110 and the polarized light transmission axis of the reflective linear polarizer 221 included in the second display layer 220 are usually set parallel to each other. This parallelism may include an error within a range where the concealability of the second display layer 220 can be enhanced. The range of the angle formed between the polarized light transmission axis of the polarized light separation layer 110 and the polarized light transmission axis of the second display layer 220 may be the same as that of the angle formed between the polarized light transmission axis of the polarized light separation layer 110 and the polarized light transmission axis of the first display layer 120 described in the first embodiment. Furthermore, the range of the angle formed between the polarized light transmission axis of the absorptive linear polarizer 111 and the polarized light transmission axis of the reflective linear polarizer 221 may be the same range as above.

The wavelength range in which the second display layer 220 according to the present embodiment including the reflective linear polarizer 221 can reflect polarized light may be the same range as the wavelength range in which the first display layer 120 described in the first embodiment can reflect polarized light. In the following description, the wavelength range in which the second display layer 220 can reflect polarized light may be referred to as a "second reflection wavelength range". The range of reflectance of the second display layer 220 in the second reflection wavelength range may be the same as the range of reflectance of the first display layer 120 in the first reflection wavelength range described in the first embodiment. The wavelength width of the second reflection wavelength range may fall within the same range as that of the wavelength width of the first reflection wavelength range described in the first embodiment.

Examples of the reflective linear polarizer 221 may include the same ones as those described in the first embodiment as examples of the reflective linear polarizer 121 included in the first display layer 120.

The second display layer 220 may include an optional layer (not shown) in combination with the reflective linear polarizer 221 within a range in which the advantageous effects of the present invention are not significantly impaired. Examples of the optional layer may include the same examples as the optional layers that the first display layer 120 described in the first embodiment may include.

The range of the thickness of the second display layer 220 may be the same as the range of the thickness of the first display layer 120 described in the first embodiment.

(3.2. Visibility of First Display Layer and Second Display Layer)

With the same mechanism as that described in the first embodiment, the first display layer 120 of the optical layered body 200 according to the second embodiment can be visually recognized by an observer who observes the optical layered body 200 from the first display layer 120 side of the optical layered body 200, but cannot be visually recognized by an observer who observes the optical layered body 200 from the side of the optical layered body 200 opposite with respect to the first display layer 120, under illumination light such as unpolarized light containing both linearly polarized light having a certain vibration direction and linearly polarized light having a vibration direction perpendicular to the certain vibration direction.

On the other hand, with the same mechanism as that for the first display layer 120, the second display layer 220 of the optical layered body 200 can be visually recognized by an observer who observes the optical layered body 200 from the second display layer 220 side of the optical layered body 200, but cannot be visually recognized by an observer who observes the optical layered body 200 from the side of the optical layered body 200 opposite with respect to the second display layer 220, under illumination light such as unpolarized light containing both linearly polarized light having a certain vibration direction and linearly polarized light having a vibration direction perpendicular to the certain vibration direction.

In the same manner as the optical layered body 100 according to the first embodiment, the optical layered body 200 can be visually recognized to be a transparent or translucent member. Accordingly, another member can be usually observed through the optical layered body 200.

Therefore, although the optical layered body 200 is transparent or translucent, when reflected light observation of the first display layer side is carried out, the first display layer 120 can be visually recognized, and the second display layer 220 cannot be visually recognized. Furthermore, when reflected light observation of the second display layer side is carried out, the first display layer 120 cannot be visually recognized, and the second display layer 220 can be visually recognized. Although the optical layered body 200 is transparent or translucent, the optical layered body 200 can thus achieve a specific display mode in which an image of the optical layered body visually recognized when observed from a front surface differs from an image of the optical layered body visually recognized when observed from a rear surface.

Since the polarized light separation layer 110 in the optical layered body 200 according to the present embodiment has a high average degree of polarization as in the first embodiment, the concealability of the first display layer 120 and the second display layer 220 can be improved. That is, when reflected light observation of the side of the optical layered body 200 opposite with respect to the first display layer 120 is carried out under irradiation with illumination light, the concealability of the first display layer 120 can be enhanced. In addition, when reflected light observation of the side of the optical layered body 200 opposite with respect to the second display layer 220 is carried out under irradiation with illumination light, the concealability of the second display layer 220 can be enhanced. Furthermore, according to the optical layered body 200 of the present embodiment, the same advantages as those of the optical layered body 100 described in the first embodiment can be obtained.

(3.3. Method for Determining Authenticity)

The optical layered body 200 according to the second embodiment can be used for determination of authenticity using polarized light, in the same manner as the optical layered body 100 according to the first embodiment.

For example, the authenticity of the optical layered body 200 may be determined by a determination method including:

a third step of observing, from the first display layer 120 side, reflected light of light for illuminating the first display layer 120 side of the optical layered body 200 to determine whether the first display layer 120 and the second display layer 220 can be visually recognized; and a fourth step of observing, from the side opposite with respect to the first display layer 120, reflected light of light for illuminating the side of the optical layered body 200 opposite with respect to the first display layer 120 to determine whether the first display layer 120 and the second display layer 220 can be visually recognized.

In the third step of the above-mentioned determination method, the first display layer 120 side of the optical layered body 200 is irradiated with light such as unpolarized light containing both linearly polarized light having a certain vibration direction and linearly polarized light having a vibration direction perpendicular to the certain vibration direction. The optical layered body 200 is then observed from the first display layer 120 side to determine whether the first display layer 120 and the second display layer 220 can be visually recognized. When the optical layered body 200 is authentic, the first display layer 120 can be visually recognized, but the second display layer 220 cannot be visually recognized.

In the fourth step of the above-mentioned determination method, the side of the optical layered body 200 opposite with respect to the first display layer 120 is irradiated with light such as unpolarized light containing both linearly polarized light having a certain vibration direction and linearly polarized light having a vibration direction perpendicular to the certain vibration direction. The optical layered body 200 is then observed from the side opposite with respect to the first display layer 120 to determine whether the first display layer 120 and the second display layer 220 can be visually recognized. When the optical layered body 200 is authentic, the first display layer 120 cannot be visually recognized, but the second display layer 220 can be visually recognized.

Therefore, in a case where the first display layer 120 can be visually recognized and the second display layer 220 cannot be visually recognized in the third step, and the first display layer 120 cannot be visually recognized and the second display layer 220 can be visually recognized in the fourth step, the optical layered body 200 can be determined to be authentic. In other cases, the optical layered body 200 can be determined to be inauthentic. As described above, the simple method without using a viewer can determine the authenticity of the optical layered body 200 according to the present embodiment, in the same manner as the optical layered body 100 according to the first embodiment.

4. Third Embodiment

Figure 5:
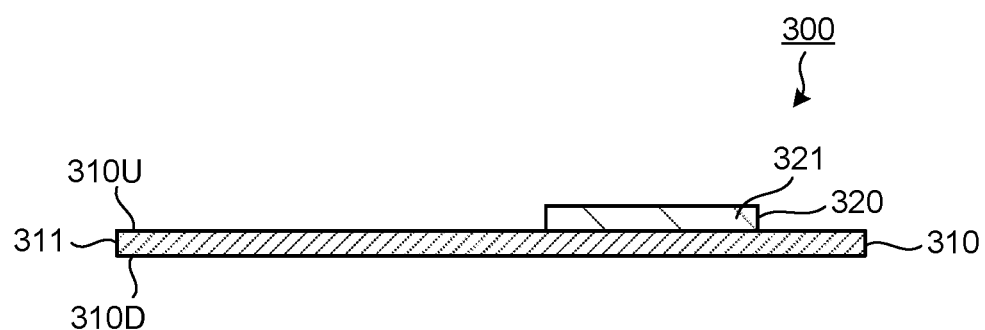
FIG. 5 is a cross-sectional view schematically illustrating an optical layered body according to a third embodiment of the present invention.

FIG. 5 is a cross-sectional view schematically illustrating an optical layered body 300 according to a third embodiment of the present invention. As shown in FIG. 5, the optical layered body 300 according to the third embodiment of the present invention includes a polarized light separation layer 310 including a reflective linear polarizer 311, and a first display layer 320 including an absorptive linear polarizer 321. The optical layered body 300 is configured in the same manner as the optical layered body 100 according to the first embodiment, except that the polarized light separation layer 310 includes the reflective linear polarizer 311 instead of the absorptive linear polarizer 111 and the first display layer 320 includes the absorptive linear polarizer 321 instead of the reflective linear polarizer 121.

Therefore, the polarized light separation layer 310 has a first surface 310U as one main surface and a second surface 310D as another main surface opposite with respect to the first surface 310U. On one of the first surface 310U and the second surface 310D, the first display layer 320 is disposed directly or indirectly. In the present embodiment, an example in which the first display layer 320 is disposed on the first surface 310U of the polarized light separation layer 310 is shown for description.

The first display layer 320 is usually disposed on a part of the first surface 310U of the polarized light separation layer 310. As viewed in the thickness direction, a part or the entirety of the first display layer 320 is usually disposed so as to overlap with a part of the polarized light separation layer 310. Therefore, in in-plane directions perpendicular to the thickness direction of the optical layered body 300, a position of a part or the entirety of the first display layer 320 is usually the same as a position of a part of the polarized light separation layer 310. In this case, as viewed in the thickness direction, the absorptive linear polarizer 321 of the first display layer 320 may overlap with a part of the polarized light separation layer 310. In the present embodiment, an example in which the entirety of the first display layer 320 overlaps with a part of the polarized light separation layer 310 as viewed in the thickness direction is shown for description.

The first display layer 320 may generally have a planer shape according to the design of the optical layered body 300. Examples of the planer shape of the first display layer 320 may include, but are not limited to, characters, numerals, symbols, and figures.

(4.1. Polarized Light Separation Layer)

The polarized light separation layer 310 according to the present embodiment is a linear polarizer including the reflective linear polarizer 311. When at least one surface of the reflective linear polarizer 311 is irradiated with unpolarized light, the reflective linear polarizer 311 can transmit linearly polarized light having a certain vibration direction, and can reflect other polarized light. Therefore, when at least one surface of the polarized light separation layer 310 according to the present embodiment including the reflective linear polarizer 311 is irradiated with unpolarized light, the polarized light separation layer 310 can also transmit linearly polarized light having the certain vibration direction, and can reflect other polarized light. As described above, the vibration direction of linearly polarized light that has been transmitted through the reflective linear polarizer 311 to go out thereof may coincide with a polarized light transmission axis of the reflective linear polarizer 311, and the vibration direction of linearly polarized light that has been transmitted through the polarized light separation layer 310 to go out thereof may coincide with a polarized light transmission axis of the polarized light separation layer 310.

The polarized light separation layer 310 has a particular high degree of polarization within a wide range in the visible wavelength range. Specifically, the range of average degree of polarization of the polarized light separation layer 310 at a wavelength of 400 nm to 680 nm may be the same as the range of average degree of polarization of the polarized light separation layer 110 at a wavelength of 400 nm to 680 nm as described in the first embodiment. Usually, the polarized light separation layer 310 having the average degree of polarization within this range can selectively transmit linearly polarized light having a vibration direction parallel to the polarized light transmission axis over a wide visible wavelength range including the above-mentioned wavelength of 400 nm to 680 nm. Preferably, the polarized light separation layer 310 can selectively transmit linearly polarized light having a vibration direction parallel to the polarized light transmission axis over the entirety of the visible wavelength range.

Since the polarized light separation layer 310 according to the present embodiment includes the reflective linear polarizer 311, the polarized light separation layer 310 usually has high reflectance in the visible wavelength range. Specifically, the average reflectance of the polarized light separation layer 310 including the reflective linear polarizer 311 in the visible wavelength range with respect to unpolarized light is usually 35% or more, and preferably 40% or more, and is usually 50% or less.

Examples of the reflective linear polarizer 311 may include a multi-layer reflective polarizer; a wire grid polarizer; and a polarizer including a combination of a phase difference layer and a layer containing a cholesteric resin. As the multi-layer reflective polarizer and the wire grid polarizer, those described in the first embodiment may be used.

As the phase difference layer and the layer containing a cholesteric resin in the polarizer including the combination of the phase difference layer and the layer containing a cholesteric resin, those described in the first embodiment may be used. When this polarizer is used, the phase difference layer is usually disposed between the layer containing a cholesteric resin and the first display layer 320 such that linearly polarized light obtained as light having been transmitted through the layer containing a cholesteric resin and the phase difference layer in this order can enter the first display layer 320. The polarizer including the combination of the phase difference layer and the layer containing a cholesteric resin may include a first phase difference layer, the layer containing a cholesteric resin, and a second phase difference layer, in this order in the thickness direction. By this polarizer, linearly polarized light can be obtained as light that is transmitted through the first phase difference layer, the layer containing a cholesteric resin, and the second phase difference layer, in this order, and linearly polarized light can be also obtained as light that is transmitted through the second phase difference layer, the layer containing a cholesteric resin, and the first phase difference layer, in this order.

The polarized light separation layer 310 may include an optional layer (not shown) in combination with the reflective linear polarizer 311 within a range in which the advantageous effects of the present invention are not significantly impaired. Examples of the optional layer may include the same examples of the optional layer that the polarized light separation layer 110 described in the first embodiment may include.

The range of thickness of the polarized light separation layer 310 may be the same as the range of thickness of the polarized light separation layer 110 described in the first embodiment.

(4.2. First Display Layer)

The first display layer 320 according to the present embodiment is a linear polarizer including the absorptive linear polarizer 321. When at least one surface of the absorptive linear polarizer 321 is irradiated with unpolarized light, the absorptive linear polarizer 321 can transmit linearly polarized light having a certain vibration direction, and can absorb other polarized light. Therefore, when at least one surface of the first display layer 320 according to the present embodiment including the absorptive linear polarizer 321 is irradiated with unpolarized light, the first display layer 320 can also transmit linearly polarized light having the certain vibration direction, and can absorb other polarized light. As described above, the vibration direction of linearly polarized light that has been transmitted through the absorptive linear polarizer 321 to go out thereof may coincide with a polarized light transmission axis of the absorptive linear polarizer 321, and the vibration direction of linearly polarized light that has been transmitted through the first display layer 320 to go out thereof may coincide with a polarized light transmission axis of the first display layer 320.

The polarized light transmission axis of the first display layer 320 is set such that linearly polarized light that has been transmitted through the polarized light separation layer 310 can be transmitted through the first display layer 320. The polarized light transmission axis of the first display layer 320 and the polarized light transmission axis of the polarized light separation layer 310 are thus usually set parallel to each other. Therefore, the polarized light transmission axis of the reflective linear polarizer 311 included in the polarized light separation layer 310 and the polarized light transmission axis of the absorptive linear polarizer 321 included in the first display layer 320 are usually set parallel to each other. This parallelism may include an error within a range where the concealability of the first display layer 320 can be enhanced. The range of the angle formed between the polarized light transmission axis of the polarized light separation layer 310 and the polarized light transmission axis of the first display layer 320 may be the same as that of the angle formed between the polarized light transmission axis of the polarized light separation layer 110 and the polarized light transmission axis of the first display layer 120 described in the first embodiment. Furthermore, the range of the angle formed between the polarized light transmission axis of the reflective linear polarizer 311 and the polarized light transmission axis of the absorptive linear polarizer 321 may be the same range as above.

Since the first display layer 320 according to the present embodiment includes the absorptive linear polarizer 321, the first display layer 320 usually has low reflectance in the visible wavelength range. Specifically, the average reflectance of the first display layer 320 including the absorptive linear polarizer 321 in the visible wavelength range may fall within the same range as that of the average reflectance of the polarized light separation layer 110 including the absorptive linear polarizer 111 described in the first embodiment in the visible wavelength range. Since the first display layer 320 has such a low reflectance, the first display layer 320 can be visually recognized as a portion where the reflected light is weaker than the surroundings.

Examples of the absorptive linear polarizer 321 may include the same ones described in the first embodiment.

The first display layer 320 may include an optional layer (not shown) in combination with the absorptive linear polarizer 321 within a range in which the advantageous effects of the present invention are not significantly impaired. Examples of the optional layer may include the same examples as the optional layers that the first display layer 120 described in the first embodiment may include.

The thickness of the first display layer 320 may fall within the same range as that of the thickness of the first display layer 120 described in the first embodiment.

(4.3. Visibility of First Display Layer)

Figure 6:
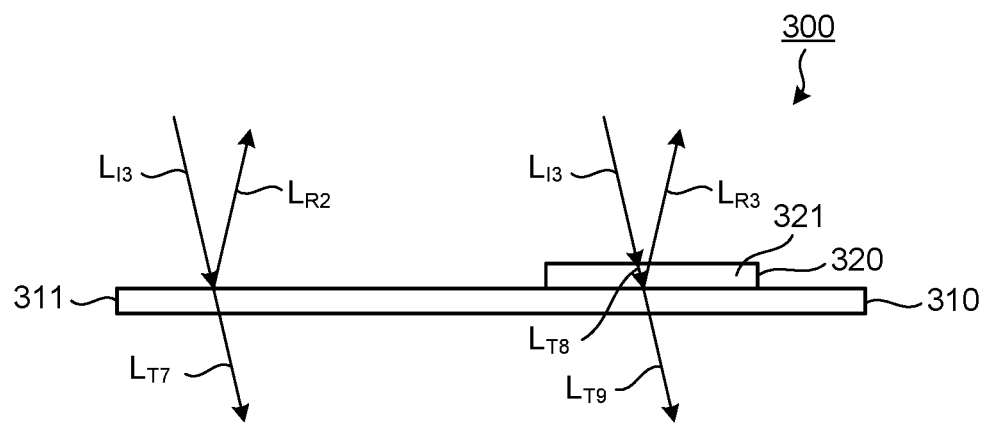
FIG. 6 is a cross-sectional view schematically illustrating the optical layered body according to the third embodiment of the present invention.
Figure 7:
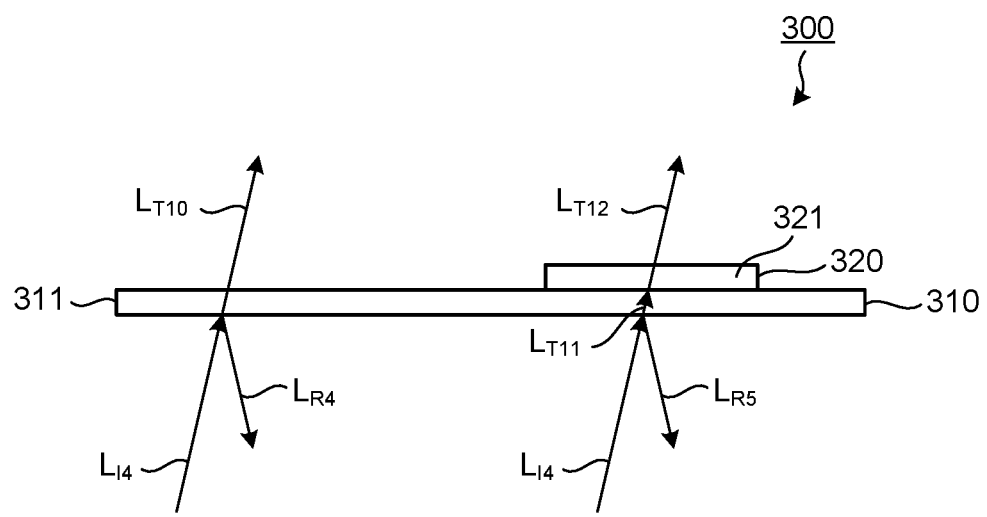
FIG. 7 is a cross-sectional view schematically illustrating the optical layered body according to the third embodiment of the present invention.

FIGS. 6 and 7 are cross-sectional views schematically illustrating the optical layered body 300 according to the third embodiment of the present invention. FIGS. 6 and 7 schematically show paths of light reflected by the polarized light separation layer 310 and the first display layer 320. Although an actual optical layered body 300 may cause various light absorptions and reflections other than those described later, main paths of light will be schematically described in the following description for convenience of description of actions.

FIG. 6 shows a case where the first display layer 320 side of the optical layered body 300 is irradiated with illumination light $L_{I3}$ such as unpolarized light containing both linearly polarized light having a certain vibration direction and linearly polarized light having a vibration direction perpendicular to the certain vibration direction. As shown in FIG. 6, at an area where the first display layer 320 is not disposed, the illumination light $L_{I3}$ enters the polarized light separation layer 310. A part of the polarized light $L_{R2}$ contained in the illumination light $L_{I3}$ is reflected by the polarized light separation layer 310 including the reflective linear polarizer 311. Polarized light $L_{T7}$ other than the reflected polarized light $L_{R2}$ is transmitted through the polarized light separation layer 310 and goes out of the optical layered body 300.

As shown in FIG. 6, at the area where the first display layer 320 is disposed, the first display layer 320 and the polarized light separation layer 310 are arranged in this order. Thus, the illumination light $L_{I3}$ enters the first display layer 320. A part of the polarized light contained in the illumination light $L_{I3}$ is adsorbed by the first display layer 320 including the absorptive linear polarizer 321. Light $L_{T8}$ other than the absorbed polarized light enters the polarized light separation layer 310. A part of the polarized light $L_{R3}$ contained in the entering light $L_{T8}$ may be reflected by the reflective linear polarizer 311. Polarized light $L_{T9}$ other than the reflected polarized light $L_{R3}$ is transmitted through the polarized light separation layer 310 and goes out of the optical layered body 300.

Thus, when the first display layer 320 side of the optical layered body 300 is irradiated with the illumination light $L_{I3}$, polarized light $L_{R2}$ is obtained as strong reflected light by the polarized light separation layer 310 at an area where the first display layer 320 is not disposed, whereas polarized light $L_{R3}$ as weak reflected light is obtained, or any reflected light is not obtained, at an area where the first display layer 320 is disposed. Thus, when reflected light observation of the first display layer 320 side is carried out under irradiation with the illumination light $L_{I3}$, the first display layer 320 can be visually recognized by an observer as a portion where the reflected light is weaker than the surroundings.

Although not shown in FIG. 6, at an area where the first display layer 320 is disposed, a part of the illumination light $L_{I3}$ may be reflected by the first display layer 320 to obtain reflected light. Even in this case, the intensity of the reflected light described above is usually sufficiently weaker than the polarized light $L_{R2}$ reflected by the polarized light separation layer 310. Therefore, even in this case, the first display layer 320 can be visually recognized as a portion having weaker reflection than the surroundings.

On the other hand, FIG. 7 illustrates a case where the optical layered body 300 is irradiated with illumination light $L_{I4}$ such as unpolarized light containing both linearly polarized light having a certain vibration direction and linearly polarized light having a vibration direction perpendicular to the certain vibration direction, on the side opposite with respect to the first display layer 320 of the optical layered body 300. As illustrated in FIG. 7, at an area where the first display layer 320 is not disposed, the illumination light $L_{I4}$ enters the polarized light separation layer 310. A part of the polarized light $L_{R4}$ contained in the illumination light $L_{I4}$ is reflected by the polarized light separation layer 310 including the reflective linear polarizer 311. Polarized light $L_{T10}$ other than the reflected polarized light $L_{R4}$ is transmitted through the polarized light separation layer 310 and goes out of the optical layered body 300. Usually, the polarized light $L_{T10}$ that has been transmitted through the polarized light separation layer 310 is linearly polarized light having a vibration direction parallel to the polarized light transmission axis of the polarized light separation layer 310.

As shown in FIG. 7, at the area where the first display layer 320 is disposed, as in the area where the first display layer 320 is not disposed, a part of the polarized light $L_{R5}$ contained in the irradiation light $L_{I4}$ is reflected by the polarized light separation layer 310 including the reflective linear polarizer 311 while polarized light $L_{T11}$ other than the reflected polarized light $L_{R5}$ is transmitted through the polarized light separation layer 310. The polarized light $L_{T11}$ that has been transmitted through the polarized light separation layer 310 then enters the first display layer 320. The polarized light $L_{T11}$ that has entered the first display layer 320 is linearly polarized light that can be transmitted through the absorptive linear polarizer 321 included in the first display layer 320. Therefore, the entirety or most of the polarized light $L_{T11}$ that has entered the first display layer 320 is not absorbed by the first display layer 320. Therefore, the light $L_{T12}$ as the entirety or most of the polarized light $L_{T11}$ is transmitted through the first display layer 320 and goes out of the optical layered body 300.

Thus, when the side of the optical layered body 300 opposite with respect to the first display layer 320 is irradiated with the illumination light $L_{I4}$, the light is neither absorbed nor reflected by the first display layer 320 or is slightly absorbed or reflected. When reflected light observation of the side opposite with respect to the first display layer 320 is carried out under irradiation with the illumination light $L_{I4}$, the observer cannot visually recognize light reflected by the first display layer 320. Therefore, the observer who performs reflected light observation of the side of the optical layered body 300 opposite with respect to the first display layer 320 cannot visually recognize the first display layer 320.

When the first display layer 320 side of the optical layered body 300 is irradiated or the side of the optical layered body 300 opposite with respect to the first display layer 320 is irradiated, light can be partially transmitted through the optical layered body 300, as described above. Therefore, the optical layered body 300 can be visually recognized to be a transparent or translucent member as in the optical layered body 100 described in the first embodiment. Accordingly, another member can be usually observed through the optical layered body 300.

Therefore, although the optical layered body 300 is transparent or translucent, the first display layer 320 can be visually recognized when reflected light observation of the first display layer 320 side is carried out, but the first display layer 320 cannot be visually recognized when reflected light observation of the side opposite with respect to the first display layer 320 is carried out. Although the optical layered body 300 is transparent or translucent, the optical layered body 300 can thus achieve a specific display mode in which an image of the optical layered body visually recognized when observed from a front surface differs from an image of the optical layered body visually recognized when observed from a rear surface.

In the present embodiment, the polarized light separation layer 310 has a high average degree of polarization. Therefore, when the side of the optical layered body 300 opposite with respect to the first display layer 320 is irradiated with illumination light, the concealability of the first display layer 320 can be enhanced in the same manner as the first to second embodiments. According to this optical layered body 300, the authenticity of the optical layered body 300 can be determined by the same method as the authenticity determination method described in the first embodiment without using a viewer. Furthermore, according to the optical layered body 300 according to the present embodiment, the same advantages as those of the optical layered bodies 100 and 200 described in the first and second embodiments can be obtained.

5. Fourth Embodiment

Figure 8:
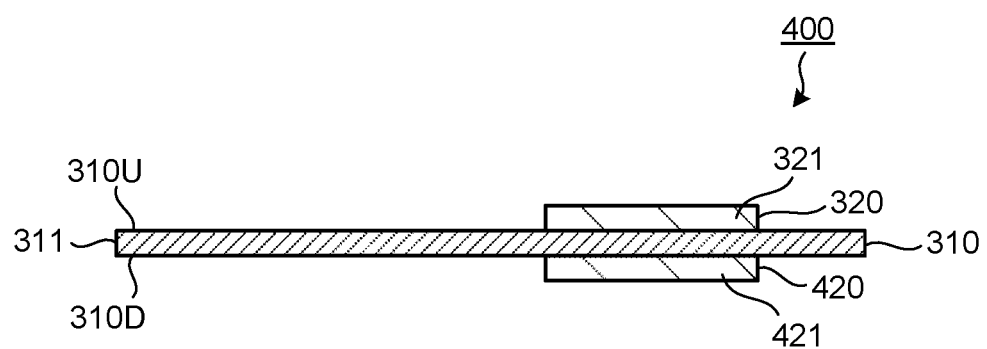
FIG. 8 is a cross-sectional view schematically illustrating an optical layered body according to a fourth embodiment of the present invention.

FIG. 8 is a cross-sectional view schematically illustrating an optical layered body 400 according to a fourth embodiment of the present invention. As shown in FIG. 8, the optical layered body 400 according to the fourth embodiment of the present invention includes a second display layer 420, the polarized light separation layer 310, and the first display layer 320, in this order in the thickness direction. The optical layered body 400 is configured in the same manner as the optical layered body 300 according to the third embodiment, except that the optical layered body 400 further includes the second display layer 420 in combination with the polarized light separation layer 310 and the first display layer 320. Therefore, the polarized light separation layer 310 and the first display layer 320 included in the optical layered body 400 may be the same as those included in the optical layered body 300 according to the third embodiment, and thus the same advantageous effects as those described in the third embodiment can be obtained.

(5.1. Second Display Layer)

The second display layer 420 is a linear polarizer including an absorptive linear polarizer 421, and is disposed directly or indirectly on the surface of the polarized light separation layer 310 opposite with respect to the first display layer 320. In the present embodiment, an example in which the second display layer 420 is disposed on the second surface 310D of the polarized light separation layer 310 will be described. Accordingly, the optical layered body 400 includes the second display layer 420, the polarized light separation layer 310, and the first display layer 320, in this order in the thickness direction.

The second display layer 420 may be disposed in the same manner as the first display layer 320, except that the second display layer 420 is disposed on the surface of the polarized light separation layer 310 opposite with respect to the first display layer 320. With such a second display layer 420, the same advantages as those of the first display layer 320 can be obtained.

Therefore, the second display layer 420 is usually disposed on a part of the second surface 310D of the polarized light separation layer 310. Thus, a part or the entirety of the second display layer 420 is disposed so as to overlap with a part of the polarized light separation layer 310 as viewed in the thickness direction. In this case, the absorptive linear polarizer 421 of the second display layer 420 may overlap with a part of the polarized light separation layer 310 as viewed in the thickness direction. In the present embodiment, the entirety of the second display layer 420 overlaps with a part of the polarized light separation layer 310 as viewed in the thickness direction. The factors such as the size, shape, position, and number of the second display layer 420 may be different from those of the first display layer 320.

The second display layer 420 according to the present embodiment includes the absorptive linear polarizer 421. When at least one surface of the absorptive linear polarizer 421 is irradiated with unpolarized light, the absorptive linear polarizer 421 can transmit linearly polarized light having a certain vibration direction, and can absorb other polarized light. Therefore, when at least one surface of the second display layer 420 according to the present embodiment including the absorptive linear polarizer 421 is irradiated with unpolarized light, the second display layer 420 can also transmit linearly polarized light having the certain vibration direction and can absorb other polarized light. As described above, the vibration direction of the linearly polarized light that has been transmitted through the absorptive linear polarizer 421 to go out thereof may coincide with the polarized light transmission axis of the absorptive linear polarizer 421, and the vibration direction of the linearly polarized light that has been transmitted through the second display layer 420 to go out thereof may coincide with the polarized light transmission axis of the second display layer 420.

The polarized light transmission axis of the second display layer 420 is set so that the linearly polarized light that has been transmitted through the polarized light separation layer 310 can be transmitted through the second display layer 420. The polarized light transmission axis of the second display layer 420 and the polarized light transmission axis of the polarized light separation layer 310 are thus usually set parallel to each other. Therefore, the polarized light transmission axis of the reflective linear polarizer 311 included in the polarized light separation layer 310 and the polarized light transmission axis of the absorptive linear polarizer 421 included in the second display layer 420 are usually set parallel to each other. This parallelism may include an error within a range where the concealability of the second display layer 420 can be enhanced. The range of the angle formed between the polarized light transmission axis of the polarized light separation layer 310 and the polarized light transmission axis of the second display layer 420 may be the same as that of the angle formed between the polarized light transmission axis of the polarized light separation layer 110 and the polarized light transmission axis of the first display layer 120 described in the first embodiment. Furthermore, the range of the angle formed between the polarized light transmission axis of the reflective linear polarizer 311 and the polarized light transmission axis of the absorptive linear polarizer 421 may be the same range as above.

The average reflectance of the second display layer 420 including the absorptive linear polarizer 421 in the visible wavelength range may fall within the same range as that of the average reflectance of the polarized light separation layer 110 including the absorptive linear polarizer 111 described in the first embodiment in the visible wavelength range.

Examples of the absorptive linear polarizer 421 may include the same ones described in the third embodiment as examples of the absorptive linear polarizer 321 included in the first display layer 320.

The second display layer 420 may include an optional layer (not shown) in combination with the absorptive linear polarizer 421 within a range in which the advantageous effects of the present invention are not significantly impaired. Examples of the optional layer may include the same examples as the optional layers that the first display layer 120 described in the first embodiment may include.

The range of the thickness of the second display layer 420 may be the same as the range of the thickness of the first display layer 120 described in the first embodiment.

(5.2. Visibility of Respective Layers Included in Optical Layered Body)

With the same mechanism as that described in the third embodiment, the first display layer 320 of the optical layered body 400 according to the fourth embodiment can be visually recognized by an observer who observes the optical layered body 400 from the first display layer 320 side of the optical layered body 400, but cannot be visually recognized by an observer who observes the optical layered body 400 from the side of the optical layered body 400 opposite with respect to the first display layer 320, under illumination light such as unpolarized light containing both linearly polarized light having a certain vibration direction and linearly polarized light having a vibration direction perpendicular to the certain vibration direction.

On the other hand, with the same mechanism as that for the first display layer 320, the second display layer 420 of the optical layered body 400 can be visually recognized by an observer who observes the optical layered body 400 from the second display layer 420 side of the optical layered body 400, but cannot be visually recognized by an observer who observes the optical layered body 400 from the side of the optical layered body 400 opposite with respect to the second display layer 420, under illumination light such as unpolarized light containing both linearly polarized light having a certain vibration direction and linearly polarized light having a vibration direction perpendicular to the certain vibration direction.

In the same manner as the optical layered body 300 according to the third embodiment, the optical layered body 400 can be visually recognized to be a transparent or translucent member. Accordingly, another member can be usually observed through the optical layered body 400.

Therefore, although the optical layered body 400 is transparent or translucent, when reflected light observation of the first display layer side is carried out, the first display layer 320 can be visually recognized, but the second display layer 420 cannot be visually recognized. When reflected light observation of the second display layer side is carried out, the first display layer 320 cannot be visually recognized, but the second display layer 420 can be visually recognized. Although the optical layered body 400 is transparent or translucent, the optical layered body 400 can thus achieve a specific display mode in which an image of the optical layered body visually recognized when observed from a front surface differs from an image of the optical layered body visually recognized when observed from a rear surface.

Since the polarized light separation layer 310 according to the present embodiment has a high average degree of polarization as in the first to third embodiments, the concealability of the first display layer 320 and the second display layer 420 can be improved. That is, when reflected light observation of the side of the optical layered body 400 opposite with respect to the first display layer 320 is carried out under irradiation with illumination light, the concealability of the first display layer 320 can be enhanced. In addition, when reflected light observation of the side of the optical layered body 400 opposite with respect to the second display layer 420 is carried out under irradiation with illumination light, the concealability of the second display layer 420 can be enhanced. According to this optical layered body 400, the authenticity of the optical layered body 400 can be determined by the same method as the authenticity determination method described in the second embodiment without using a viewer. Furthermore, according to the optical layered body 400 of the present embodiment, the same advantages as those of the optical layered bodies 100, 200, and 300 described in the first to third embodiments can be obtained.

6. Modified Examples

The optical layered body is not limited to those described in the first to fourth embodiments. For example, the optical layered body may further include an optional element in combination with the polarized light separation layers 110 and 310, the first display layers 120 and 320, and the second display layer 220 and 420 described above.

The optical layered body may include, for example, an optional colored layer containing colorants such as a pigment and a dye that do not generate polarized light. The colored layer may be disposed on the first surface of the polarized light separation layer or on the second surface thereof.

Furthermore, the optical layered body may include, for example, an adhesive layer for bonding the above-described layers to each other. Specific examples of the adhesive layer included in the optical layered body may include an adhesive layer between the polarized light separation layer and the first display layer, and an adhesive layer between the polarized light separation layer and the second display layer. The adhesive layer preferably has a low in-plane retardation as in the optional layer that may be included in the polarized light separation layer.

Furthermore, for example, the optical layered body may include a cover layer that protects each of the above-described layers. These cover layers are preferably disposed on the outside of the layers described above. As a specific example, the optical layered body may include a cover layer, a second display layer, a polarized light separation layer, a first display layer, and a cover layer, in this order in the thickness direction. Such a cover layer may be formed of a transparent material, for example, a resin.

Furthermore, for example, the optical layered body may include an optional layer which has a low in-plane retardation and is disposed between the above-described respective layers, and an optional layer which has a low in-plane retardation and serves as the outermost layer of the optical layered body, as long as the advantageous effects of the present invention are not significantly impaired. An optional layer having such a low in-plane retardation may be hereinafter referred to as a "low Re layer". The specific in-plane retardation of such a low Re layer is usually 0 nm or more and 5 nm or less. Examples of the position where the low Re layer is disposed may include, but are not limited to, a position on a side of the first display layer opposite with respect to the polarized light separation layer, a position between the first display layer and the polarized light separation layer, a position between the polarized light separation layer and the second display layer, and a position on a side of the second display layer opposite with respect to the polarized light separation layer. The low Re layer preferably has a high light transmittance, and the total light transmittance of the low Re layer is preferably 80% or more, and more preferably 85% or more. Examples of the material for such a low Re layer may include a hard polyvinyl chloride, a soft polyvinyl chloride, an acrylic resin, glass, a polycarbonate (PC), and a polyethylene terephthalate (PET). The specific material may be appropriately selected depending on the application, desired texture, durability, and mechanical strength of the optical layered body.

7. Article Including Optical Layered Body

The above-described optical layered body may be used alone, or may be used as an article in combination with another member. Examples of an article including the optical layered body may include an article including a body member and an optical layered body provided on the body member.

The range of the body member is not restricted. Examples of the body member may include, but are not limited to, textile products such as clothes; leather products such as a bag and a shoe; metal products such as a screw; paper products such as a booklet, a price tag, and packing sheet; plastic products such as a card and a polymer banknote; and rubber products such as a tire. Hereinafter, a booklet (for example, a passport) as an article according to the fifth embodiment of the present invention as an example will be described.

Figure 9:
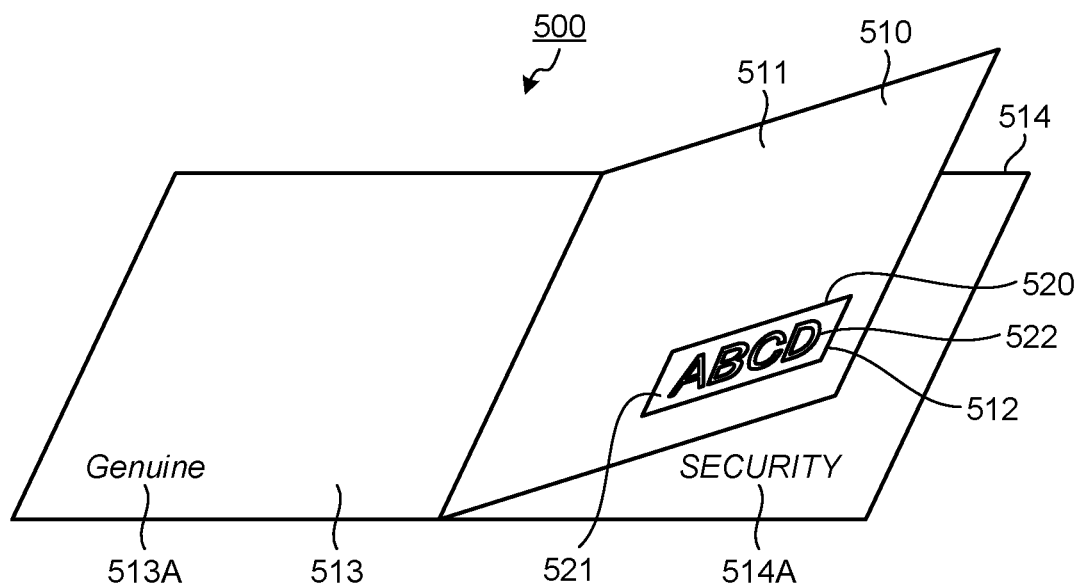
FIG. 9 is a perspective view schematically illustrating a booklet as an article according to a fifth embodiment of the present invention.
Figure 10:
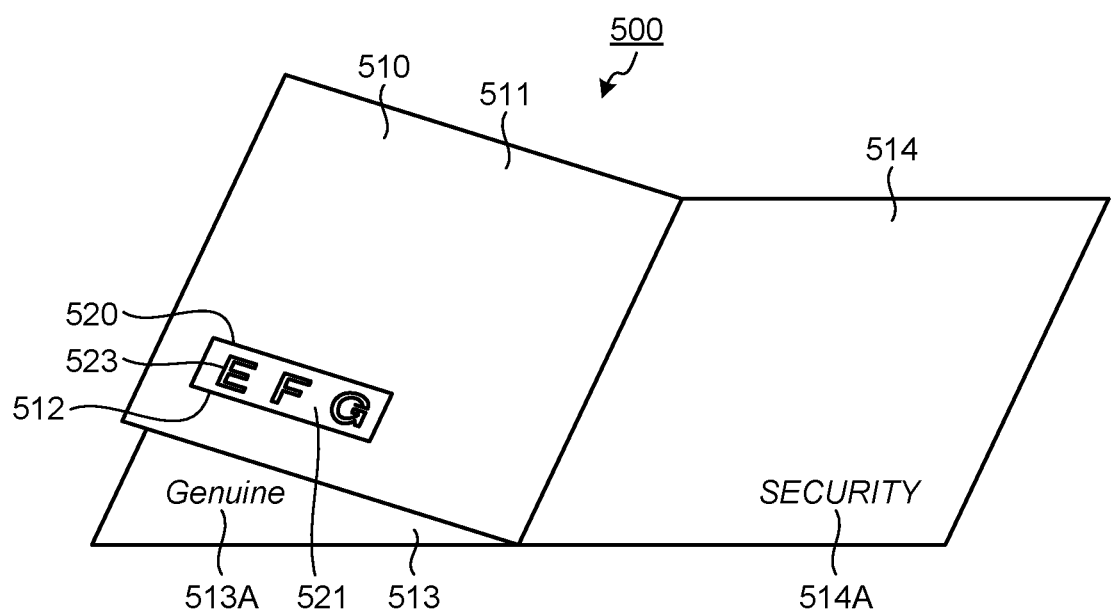
FIG. 10 is a perspective view schematically illustrating the booklet as the article according to the fifth embodiment of the present invention.

FIGS. 9 and 10 are perspective views schematically illustrating a booklet 500 as an article according to a fifth embodiment of the present invention. As shown in FIGS. 9 and 10, the booklet 500 as the article according to the fifth embodiment of the present invention includes a booklet body 510 as the body member and an optical layered body 520. Specifically, a part of "n"th leaf 511 of the booklet body 510 has an opening 512 passing through the "n"th leaf 511, and the optical layered body 520 is provided in the opening 512. Herein, "n" is an integer of 2 or more.

Character information "Genuine" is printed at an area 513A on which the optical layered body 520 is to be overlaid, on a "n−1"th leaf 513 of the booklet body 510. Character information "SECURITY" is printed at an area 514A on which the optical layered body 520 is to be overlaid, on a "n+1"th leaf 514 of the booklet.

In the present embodiment, the optical layered body 520 is a sheet including a polarized light separation layer 521, a first display layer 522 disposed on one surface of the polarized light separation layer 521, and a second display layer 523 disposed on another surface of the polarized light separation layer 521. The first display layer 522 has a planer shape with character string "ABCD", and is formed on a side facing the "n−1"th leaf 513. The second display layer 523 has a planer shape with character string "EFG", and is formed on a side facing the "n+1"th leaf 514.

When the "n"th leaf 511 of the booklet 500 is overlaid on the "n+1"th leaf 514 and observed under irradiation with unpolarized illumination light, the observer can visually recognize light reflected by the first display layer 522 of the optical layered body 520, but cannot visually recognize light reflected by the second display layer 523. Since the optical layered body 520 is transparent or translucent, illumination light is transmitted through the optical layered body 520, enters the "n+1"th leaf 514, is reflected, is transmitted through the optical layered body 520 again, and can be visually recognized by the observer. Therefore, the observer can visually recognize the character string "ABCD" displayed in the first display layer 522, cannot visually recognize the character string "EFG" displayed in the second display layer 523, and can visually recognize the character information "SECURITY" printed on the leaf 514 through the optical layered body 520.

When the "n"th leaf 511 of the booklet 500 is overlaid on the "n−1"th leaf 513 and observed under irradiation with unpolarized illumination light, the observer cannot visually recognize light reflected by the first display layer 522 of the optical layered body 520, but can visually recognize light reflected by the second display layer 523. Since the optical layered body 520 is transparent or translucent, illumination light is transmitted through the optical layered body 520, enters the "n−1"th leaf 513, is reflected, is transmitted through the optical layered body 520 again, and can be visually recognized by the observer. Therefore, the observer cannot visually recognize the character string "ABCD" displayed in the first display layer 522, can visually recognize the character string "EFG" displayed in the second display layer 523, and can visually recognize the character information "Genuine" printed on the leaf 513 through the optical layered body 520.

Accordingly, the authenticity of the booklet 500 can be identified and determined using the optical layered body 520, and therefore difficultly in counterfeiting of the booklet 500 can be enhanced. According to the optical layered body 520, a novel display mode that has not been conventionally achieved can be achieved, and giving a great impact to the observer can be expected.

EXAMPLE

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure (23° C. and 1 atm) in the atmosphere unless otherwise specified.

In the following description, as the tackiness agent, a transparent tackiness tape "LUCIACS CS9621T" (thickness: 25 μm, visible light transmittance: 90% or more, in-plane retardation: 3 nm or less) manufactured by Nitto Denko Corporation was used, unless otherwise specified.

<Method for Measuring Reflectance of Cholesteric Resin Layer>

The reflectance when unpolarized light (wavelength: 400 nm to 780 nm) entered a cholesteric resin layer was measured with an ultraviolet-visible spectrophotometer (UV-Vis 550, manufactured by JASCO Corporation).

<Method for Measuring Average Degree of Polarization>

The degree of polarization of a member to be measured in a measurement wavelength range of 400 nm to 680 nm was measured with a polarimeter ("AxoScan high-speed high-precision Mueller matrix polarimeter" manufactured by AXOmetrics, Inc.). The measurement was performed in the thickness direction (incidence angle: 0°), and a value output as measurement item "TOTAL POLARIZANCE" of the polarimeter was read to obtain the degree of polarization at each wavelength in the above-mentioned measurement wavelength range. An average of the degree of polarization thus obtained in a wavelength range of 400 nm to 680 nm was calculated as the average degree of polarization.

Production Example 1: Production of Reflective Linear Polarizer 1 Including Cholesteric Resin Layer 21.9 parts of a photopolymerizable liquid crystal compound represented by the following formula (X1); 5.47 parts of a photopolymerizable non-liquid crystal compound represented by the following formula (X2); 1.69 parts of a polymerizable chiral agent ("LC756" manufactured by BASF); 0.9 part of a photopolymerization initiator ("Irgacure OXEO2" manufactured by Ciba Japan Co., Ltd.); 0.03 part of a surfactant ("Ftergent 209F" manufactured by Neos Co., Ltd.); and 70 parts of cyclopentanone as a solvent were mixed together to produce a cholesteric liquid crystal composition in liquid state.

<Chemical formula 1>

(X1)

<Chemical formula 2>

(X2)

As a support, a long-length polyethylene terephthalate film having isotropy in terms of in-plane refractive index ("PET film A4100" having a thickness of 100 μm manufactured by Toyobo Co., Ltd., which will be referred to as a "PET film" hereinafter) was prepared. The PET film was attached to a feeding unit of a film conveying device, and the following operation was performed while the PET film was being conveyed in a long-length direction. First, a rubbing treatment was performed in the long-length direction parallel to a conveying direction. Subsequently, onto the surface subjected to the rubbing treatment, the prepared cholesteric liquid crystal composition was applied with a die coater. As a result, an uncured film of the cholesteric liquid crystal composition was formed on one surface of the PET film. The film of the cholesteric liquid crystal composition was then subjected to an orientation treatment for 4 minutes at 120° C.

The film of the cholesteric liquid crystal composition was subjected to a band broadening treatment. In the band broadening treatment, irradiation with weak ultraviolet rays at 5 mJ/cm$^2$ to 30 mJ/cm$^2$ and a warming treatment at 100° C. to 120° C. were alternately and repeatedly performed a plurality of times to control the wavelength width of the wavelength range, in which the resulting circularly polarized light separation layer can exhibit a circularly polarized light separation function, to a desired band width. The layer of the cholesteric liquid crystal composition was then irradiated with ultraviolet rays at 800 mJ/cm$^2$ to cure the layer. As a result, a cholesteric resin layer with a thickness of 4.2 μm was formed on one surface of the long-length PET film.

A reflectance of the obtained cholesteric resin layer was measured by the above-described method. As a result of the measurement, the cholesteric resin layer was found to have a wavelength range in which the reflectance with respect to unpolarized light is 40% or more within a wavelength range of 420 nm to 680 nm.

Onto one surface of the cholesteric resin layer, a phase difference layer (a phase difference film, "Zeonor Film" manufactured by ZEON Corporation, thickness: 55 μm, in-plane retardation: Re(450)=141 nm, Re(550)=140 nm, Re(650)=140 nm) was bonded with a tackiness agent. After that, the PET film was removed to produce a reflective linear polarizer 1 having a layer configuration of phase difference layer/tackiness agent/cholesteric resin layer.

Production Example 2: Production of Reflective Linear Polarizer 2 Including Cholesteric Resin Layer A cholesteric resin layer having a thickness of 5.2 μm was formed on one surface of a long-length PET film in the same manner as the forming method of the cholesteric resin layer in Production Example 1 except that the applying thickness of the cholesteric liquid crystal composition was changed. A reflectance of the obtained cholesteric resin layer was measured by the above-described method. As a result, the cholesteric resin layer was found to have a wavelength range in which the reflectance with respect to unpolarized light is 40% or more within a wavelength range of 400 nm to 680 nm.

Onto both surfaces of the cholesteric resin layer, a phase difference layer (a phase difference film, "Zeonor Film" manufactured by ZEON Corporation, thickness: 55 μm, in-plane retardation: Re(450)=141 nm, Re(550)=140 nm, Re(650)=140 nm) was bonded with a tackiness agent. After that, the PET film was removed. A reflective linear polarizer 2 having a layer configuration of phase difference layer/tackiness agent/cholesteric resin layer/tackiness agent/phase difference layer was produced. An average degree of polarization of the reflective linear polarizer 2 was measured and found to be 0.7053.

Production Example 3: Production of Reflective Linear Polarizer 3 Including Cholesteric Resin Layer A cholesteric resin layer having a thickness of 4.2 μm was formed on one surface of a long-length PET film in the same manner as the forming method of the cholesteric resin layer in Production Example 1 except that the applying thickness of the cholesteric liquid crystal composition was changed. A reflectance of the obtained cholesteric resin layer was measured by the above-described method. As a result, the cholesteric resin layer was found to have a wavelength range in which the reflectance with respect to unpolarized light is 40% or more within a wavelength range of 420 nm to 680 nm.

Onto both surfaces of the cholesteric resin layer, a phase difference layer (a phase difference film, "Zeonor Film" manufactured by ZEON Corporation, thickness: 55 μm, in-plane retardation: Re(450)=141 nm, Re(550)=140 nm, Re(650)=140 nm) was bonded with a tackiness agent. After that, the PET film was removed. A reflective linear polarizer 3 having a layer configuration of phase difference layer/tackiness agent/cholesteric resin layer/tackiness agent/phase difference layer was produced. An average degree of polarization of the reflective linear polarizer 3 was measured and found to be 0.6028.

Production Example 4: Production of Polarized Light Separation Layer Including Polarized Light Elimination Layer (Weak)

100.00 parts of a polymerizable liquid crystal compound ("LC242" manufactured by BASF), 3.20 parts of a polymerization initiator ("Irgacure OXE02" manufactured by Ciba Specialty Chemicals Co., Ltd.), 0.11 part of a surfactant ("KH40" manufactured by AGC Seimi Chemical Co., Ltd.), and 415.48 parts of methyl ethyl ketone were mixed together to produce a nematic liquid crystal composition in liquid state.

The above-mentioned nematic liquid crystal composition was applied onto a film made of an alicyclic olefin polymer (hereinafter sometimes referred to as a "COP film") with a #10 wire bar without any surface treatment such as a rubbing treatment to obtain a layer of the nematic liquid crystal composition.

The layer of the nematic liquid crystal composition thus obtained was kept at 90° C. for 1 minute to be subjected to an orientation treatment, so that the orientation state of the liquid crystal compound contained in the layer was changed to polydomain orientation. After that, the layer of the nematic liquid crystal composition was cured by UV irradiation at 80 mJ/cm$^2$ for 5 seconds to obtain a multi-layer film including the COP film and the polarized light elimination layer (weak) with a thickness of 2.8 μm.

The polarized light elimination layer (weak) was bonded to each surface of a multi-layer reflective polarizer ("DBEF" manufactured by 3M Company) via a tackiness agent, and the COP film was removed to obtain a polarized light separation layer having a layer configuration of "polarized light elimination layer (weak)/tackiness agent/multi-layer reflective polarizer/tackiness agent/polarized light elimination layer (weak)". The average degree of polarization of this polarized light separation layer was measured and found to be 0.7254.

Production Example 5: Production of Polarized Light Separation Layer Including Polarized Light Elimination Layer (Moderate)

A polarized light separation layer having a layer configuration of "polarized light elimination layer (moderate) having a thickness of 3.6 µm/tackiness agent/multi-layer reflective polarizer/tackiness agent/polarized light elimination layer (moderate) having a thickness of 3.6 µm" was obtained in the same manner as that of Production Example 4 except that the applying thickness of the nematic liquid crystal composition was changed. The average degree of polarization of this polarized light separation layer was measured and found to be 0.5452.

Production Example 6: Production of Polarized Light Separation Layer Including Polarized Light Elimination Layer (Strong)

A polarized light separation layer having a layer configuration of "polarized light elimination layer (strong) having a thickness of 5.2 µm/tackiness agent/multi-layer reflective polarizer/tackiness agent/polarized light elimination layer (strong) having a thickness of 5.2 µm" was obtained in the same manner as that of Production Example 4 except that the applying thickness of the nematic liquid crystal composition was changed. The average degree of polarization of this polarized light separation layer was measured and found to be 0.4073.

Example 1

An absorptive linear polarizer ("visible polarizing laminated film" manufactured by Edmund Optics Inc.; dichromatic polarizer including a polyvinyl alcohol resin) was prepared as a polarized light separation layer. The average degree of polarization of this absorptive linear polarizer was 0.9695.

A multi-layer reflective polarizer ("DBEF" manufactured by 3M Company) was prepared as a reflective linear polarizer. The multi-layer reflective polarizer was cut into a piece having a size smaller than the above-mentioned absorptive linear polarizer. The cut piece of the multi-layer reflective polarizer was bonded to each surface of the absorptive linear polarizer via a tackiness agent. The bonding operation was performed so that the polarized light transmission axis of the absorptive linear polarizer and the polarized light transmission axes of two pieces of the multi-layer reflective polarizer are parallel to one another.

By performing the above-described operations, an optical layered body having a layer configuration of "multi-layer reflective polarizer/tackiness agent/absorptive linear polarizer/tackiness agent/multi-layer reflective polarizer" was obtained. In the optical layered body, the absorptive linear polarizer corresponds to the polarized light separation layer, one of the multi-layer reflective polarizers corresponds to the first display layer, and the other multi-layer reflective polarizer corresponds to the second display layer.

Example 2

An optical layered body having a layer configuration of "cholesteric resin layer/tackiness agent/phase difference layer/tackiness agent/absorptive linear polarizer/tackiness agent/phase difference layer/tackiness agent/cholesteric resin layer" was obtained in the same manner as that of Example 1 except that the reflective linear polarizer 1 produced in Production Example 1 was used instead of the multi-layer reflective polarizer as the reflective linear polarizer. The bonding operation of the reflective linear polarizer 1 and the absorptive linear polarizer was performed so that the vibration direction of the linearly polarized light, which had been transmitted through the cholesteric resin layer and the phase difference layer of the reflective linear polarizer 1 in this order, and the polarized light transmission axis of the absorptive linear polarizer were parallel to one another. Therefore, the slow axis of the phase difference layer in one reflective linear polarizer 1 formed an angle of 45° with respect to the polarized light transmission axis of the absorptive linear polarizer, and the slow axis of the phase difference layer in the other reflective linear polarizer 1 formed an angle of 135° with respect to the polarized light transmission axis of the absorptive linear polarizer. In the optical layered body, the absorptive linear polarizer corresponds to the polarized light separation layer, one of the reflective linear polarizers 1 corresponds to the first display layer, and the other reflective linear polarizer 1 corresponds to the second display layer.

Example 3

An optical layered body having a layer configuration of "wire grid polarizer/tackiness agent/absorptive linear polarizer/tackiness agent/wire grid polarizer" was obtained in the same manner as that of Example 1 except that a wire grid polarizer ("wire grid polarizer film" manufactured by Edmund Optics Inc.) was used instead of the multi-layer reflective polarizer as the reflective linear polarizer. The bonding operation of the wire grid polarizer and the absorptive linear polarizer was performed so that the polarized light transmission axis of the absorptive linear polarizer and the polarized light transmission axes of the two wire grid polarizers were in parallel to each other. In the optical layered body, the absorptive linear polarizer corresponds to the polarized light separation layer, one of the wire grid polarizers corresponds to the first display layer, and the other wire grid polarizer corresponds to the second display layer.

Example 4

A multi-layer reflective polarizer ("DBEF" manufactured by 3M Company) was prepared as a polarized light separation layer. The average degree of polarization of this multi-layer reflective polarizer was 0.8783.

The absorptive linear polarizer ("visible polarizing laminated film" manufactured by Edmund Optics Inc.,) was cut into a piece having a size smaller than the above-mentioned multi-layer reflective polarizer. The cut piece of the absorptive linear polarizer was bonded to each surface of the multi-layer reflective polarizer via a tackiness agent. The bonding operation was performed so that the polarized light transmission axis of the multi-layer reflective polarizer and the polarized light transmission axes of two pieces of the absorptive linear polarizer were in parallel to one another.

By performing the above-described operations, an optical layered body having a layer configuration of "absorptive linear polarizer/tackiness agent/multi-layer reflective polarizer/tackiness agent/absorptive linear polarizer" was obtained. In the optical layered body, the multi-layer reflective polarizer corresponds to the polarized light separation layer, one of the absorptive linear polarizers corresponds to the first display layer, and the other absorptive linear polarizer corresponds to the second display layer.

Example 5

An optical layered body having a layer configuration of "absorptive linear polarizer/tackiness agent/phase difference layer/tackiness agent/cholesteric resin layer/tackiness agent/phase difference layer/tackiness agent/absorptive linear polarizer" was obtained in the same manner as that of Example 4 except that the reflective linear polarizer 2 produced in Production Example 2 was used instead of the multi-layer reflective polarizer as the polarized light separation layer. The bonding operation of the reflective linear polarizer 2 and each absorptive linear polarizer was performed so that the vibration direction of the linearly polarized light, which had been transmitted through the reflective linear polarizer 2 in its thickness direction and entered the absorptive linear polarizer, and the polarized light transmission axis of the absorptive linear polarizer were in parallel to each other. In the optical layered body, the reflective linear polarizer 2 corresponds to the polarized light separation layer, one of the absorptive linear polarizers corresponds to the first display layer, and the other absorptive linear polarizer corresponds to the second display layer.

Example 6

An optical layered body having a layer configuration of "absorptive linear polarizer/tackiness agent/phase difference layer/tackiness agent/cholesteric resin layer/tackiness agent/phase difference layer/tackiness agent/absorptive linear polarizer" was obtained in the same manner as that of Example 4 except that the reflective linear polarizer 3 produced in Production Example 3 was used instead of the multi-layer reflective polarizer as the polarized light separation layer. The bonding operation of the reflective linear polarizer 3 and each absorptive linear polarizer was performed so that the vibration direction of the linearly polarized light, which had been transmitted through the reflective linear polarizer 3 in its thickness direction and entered the absorptive linear polarizer, and the polarized light transmission axis of the absorptive linear polarizer were in parallel to each other. In the optical layered body, the reflective linear polarizer 3 corresponds to the polarized light separation layer, one of the absorptive linear polarizers corresponds to the first display layer, and the other absorptive linear polarizer corresponds to the second display layer.

Example 7

A wire grid polarizer ("wire grid polarizer film" manufactured by Edmund Optics Inc.,) was prepared as a polarized light separation layer. The average degree of polarization of the wire grid polarizer was 0.9658.

An optical layered body having a layer configuration of "absorptive linear polarizer/tackiness agent/wire grid polarizer/tackiness agent/absorptive linear polarizer" was obtained in the same manner as that of Example 4 except that the above-mentioned wire grid polarizer was used instead of the multi-layer reflective polarizer as the reflective linear polarizer. The bonding operation of the absorptive linear polarizer and the wire grid polarizer was performed so that the polarized light transmission axis of the wire grid polarizer and the polarized light transmission axes of the two absorptive linear polarizers were in parallel to each other. In the optical layered body, the wire grid polarizer corresponds to the polarized light separation layer, one of the absorptive linear polarizers corresponds to the first display layer, and the other absorptive linear polarizer corresponds to the second display layer.

Example 8

An optical layered body having a layer configuration of "multi-layer reflective polarizer/tackiness agent/polarized light elimination layer (weak)/tackiness agent/absorptive linear polarizer/tackiness agent/polarized light elimination layer (weak)/tackiness agent/multi-layer reflective polarizer" was obtained in the same manner as that of Example 1 except that the polarized light separation layer including the polarized light elimination layer (weak) produced in Production Example 4 was used instead of the absorptive linear polarizer as the polarized light separation layer. The bonding operation between the multi-layer reflective polarizer and the polarized light separation layer was performed so that the polarized light transmission axis of the multi-layer reflective polarizer and the polarized light transmission axis of the absorptive linear polarizer included in the polarized light separation layer were in parallel to each other. In the optical layered body, one of the multi-layer reflective polarizers corresponds to the first display layer, and the other multi-layer reflective polarizer corresponds to the second display layer.

Comparative Example 1

An optical layered body having a layer configuration of "multi-layer reflective polarizer/tackiness agent/polarized light elimination layer (moderate)/tackiness agent/absorptive linear polarizer/tackiness agent/polarized light elimination layer (moderate)/tackiness agent/multi-layer reflective polarizer" was obtained in the same manner as that of Example 1 except that the polarized light separation layer including the polarized light elimination layer (moderate) produced in Production Example 5 was used instead of the absorptive linear polarizer as the polarized light separation layer. The bonding operation between the multi-layer reflective polarizer and the polarized light separation layer was performed so that the polarized light transmission axis of the multi-layer reflective polarizer and the polarized light transmission axis of the absorptive linear polarizer included in the polarized light separation layer were in parallel to each other. In the optical layered body, one of the multi-layer reflective polarizers corresponds to the first display layer, and the other multi-layer reflective polarizer corresponds to the second display layer.

Comparative Example 2

An optical layered body having a layer configuration of "multi-layer reflective polarizer/tackiness agent/polarized light elimination layer (strong)/tackiness agent/absorptive linear polarizer/tackiness agent/polarized light elimination layer (strong)/tackiness agent/multi-layer reflective polarizer" was obtained in the same manner as that of Example 1 except that the polarized light separation layer including the polarized light elimination layer (strong) produced in Production Example 6 was used instead of the absorptive linear polarizer as the polarized light separation layer. The bonding operation between the multi-layer reflective polarizer and the polarized light separation layer was performed so that the polarized light transmission axis of the multilayer reflective polarizer and the polarized light transmission axis of the absorptive linear polarizer included in the polarized light separation layer were in parallel to each other. In the optical layered body, one of the multi-layer reflective polarizers corresponds to the first display layer, and the other multi-layer reflective polarizer corresponds to the second display layer.

<Evaluation of Concealability>

The optical layered body produced in each of Examples and Comparative Examples was placed on a stage with the first display layer facing upward, and irradiated with natural light, and first observation was performed. In this first observation, whether the second display layer on the rear side was visually recognized was examined. Next, the optical layered body was turned over, placed on the stage with the second display layer facing upward, and irradiated with natural light, and second observation was performed. In this second observation, whether the first display layer on the rear side was visually recognized was examined.

The measurement results were determined by the following criteria:

"Visible": The second display layer was clearly visually recognized in the first observation, or the first display layer was clearly visually recognized in the second observation.

"Hardly visible": The second display layer was slightly visually recognized in the first observation, or the first display layer was slightly visually recognized in the second observation.

"Not visible": The second display layer was not visually recognized at all in the first observation, and the first display layer was not visually recognized at all in the second observation.

Ten observers performed the above-mentioned determination. The number of observers who determined each criterion was counted. The determination result "visible" gave 0 points, the determination result "hardly visible" gave 1 point, and the determination result "not visible" gave 2 points. These points were added up to calculate the comprehensive evaluation point in each of Examples and Comparative Examples. The results are shown in Table 1. In Table 1, the meanings of abbreviations are as follows.

MLP: multi-layer reflective polarizer
CLC: cholesteric resin layer
ahd: tackiness agent
RET: phase difference layer
ATP: absorptive linear polarizer
WGP: wire grid polarizer
PEL(w): polarized light elimination layer (weak)
PEL(m): polarized light elimination layer (moderate)
PEL(s): polarized light elimination layer (strong)

TABLE 1

<Results of Examples and Comparative Examples>

| | Example | | | | | | | | Comparative Example | |
|---|---|---|---|---|---|---|---|---|---|---|
| | 1 | 2 | 3 | 4 | 5 | 6 | 7 | 8 | 1 | 2 |
| first display layer | MLP | CLC | WGP | ATP | ATP | ATP | ATP | MLP | MLP | MLP |
| | — | adh | — | — | — | — | — | — | — | — |
| | — | RET | — | — | — | — | — | — | — | — |
| optional layer | adh | adh | adh | adh | adh | adh | adh | adh | adh | adh |
| polarized light separation layer | ATP | ATP | ATP | MLP | RET | RET | WGP | PEL(w) | PEL(m) | PEL(s) |
| | — | — | — | — | adh | adh | — | adh | adh | adh |
| | — | — | — | — | CLC (5.2 μm) | CLC (4.2 μm) | — | ATP | ATP | ATP |
| | — | — | — | — | adh | adh | — | adh | adh | adh |
| | — | — | — | — | RET | RET | — | PEL(w) | PEL(m) | PEL(s) |
| optional layer | adh | adh | adh | adh | adh | adh | adh | adh | adh | adh |
| second display layer | MLP | RET | WGP | ATP | ATP | ATP | ATP | MLP | MLP | MLP |
| | — | adh | — | — | — | — | — | — | — | — |
| | — | CLC | — | — | — | — | — | — | — | — |
| average degree of polarization of polarized light separation layer | 0.9695 | 0.9695 | 0.9695 | 0.8783 | 0.7053 | 0.6028 | 0.9658 | 0.7254 | 0.5452 | 0.4073 |
| concealability | | | | | | | | | | |
| visible | 0 | 0 | 0 | 0 | 1 | 1 | 0 | 1 | 5 | 8 |
| hardly visible | 3 | 4 | 4 | 4 | 5 | 6 | 4 | 5 | 5 | 2 |
| not visible | 7 | 6 | 6 | 6 | 4 | 3 | 6 | 4 | 0 | 0 |
| comprehensive evaluation point | 17 | 16 | 16 | 16 | 13 | 12 | 16 | 13 | 5 | 2 |

REFERENCE SIGN LIST 100 optical layered body
110 polarized light separation layer
110U first surface
110D second surface
111 absorptive linear polarizer
120 first display layer
121 reflective linear polarizer
200 optical layered body
220 second display layer
221 reflective linear polarizer
300 optical layered body
310 polarized light separation layer
310U first surface
310D second surface
311 reflective linear polarizer
320 first display layer
321 absorptive linear polarizer
400 optical layered body
420 second display layer 421 absorptive linear polarizer
500 booklet
510 booklet body
511 leaf
512 opening
513 leaf
514 leaf
520 optical layered body
521 polarized light separation layer
522 first display layer
523 second display layer

The invention claimed is:

1. An optical layered body comprising a second display layer including a reflective linear polarizer, a polarized light separation layer and a first display layer, in this order, wherein:
   the polarized light separation layer is a linear polarizer including an absorptive linear polarizer;
   the first display layer is a linear polarizer including a reflective linear polarizer;
   the first display layer overlaps with a part of the polarized light separation layer; and
   an average degree of polarization of the polarized light separation layer at a wavelength of 400 nm to 680 nm is 0.60 or more.

2. The optical layered body according to claim 1, wherein a polarized light transmission axis of the polarized light separation layer and a polarized light transmission axis of the first display layer are in parallel to each other, and the polarized light transmission axis of the polarized light separation layer and a polarized light transmission axis of the second display layer are in parallel to each other.

3. The optical layered body according to claim 1, wherein the reflective linear polarizer included in the first display layer is a multi-layer reflective polarizer.

4. The optical layered body according to claim 1, wherein the reflective linear polarizer included in the first display layer includes a phase difference layer and a layer containing a resin having cholesteric regularity, in this order from a side of the polarized light separation layer.

5. A method for determining authenticity of the optical layered body according to claim 1, the method comprising the steps of:
   observing, from the first display layer side, reflected light of light for illuminating the first display layer side of the optical layered body to determine whether the first display layer and the second display layer can be visually recognized; and
   observing, from a side opposite with respect to the first display layer, reflected light of light for illuminating the side of the optical layered body opposite with respect to the first display layer to determine whether the first display layer and the second display layer can be visually recognized.

6. An article comprising the optical layered body according to claim 1.

7. An optical layered body comprising a second display layer including an absorptive linear polarizer, a polarized light separation layer, and a first display layer, in this order, wherein:
   the polarized light separation layer is a linear polarizer including a reflective linear polarizer; and
   the first display layer is a linear polarizer including an absorptive linear polarizer;
   the first display layer overlaps with a part of the polarized light separation layer; and
   an average degree of polarization of the polarized light separation layer at a wavelength of 400 nm to 680 nm is 0.60 or more.

8. The optical layered body according to claim 7, wherein the reflective linear polarizer included in the polarized light separation layer is a multi-layer reflective polarizer.

9. The optical layered body according to claim 7, wherein the reflective linear polarizer included in the polarized light separation layer includes a first phase difference layer, a layer containing a resin having cholesteric regularity, and a second phase difference layer, in this order.

10. A method for determining authenticity of the optical layered body according to claim 7, the method comprising the steps of:
    observing, from the first display layer side, reflected light of light for illuminating the first display layer side of the optical layered body to determine whether the first display layer and the second display layer can be visually recognized; and
    observing, from a side opposite with respect to the first display layer, reflected light of light for illuminating the side of the optical layered body opposite with respect to the first display layer to determine whether the first display layer and the second display layer can be visually recognized.

11. The optical layered body according to claim 7, wherein a polarized light transmission axis of the polarized light separation layer and a polarized light transmission axis of the first display layer are in parallel to each other, and the polarized light transmission axis of the polarized light separation layer and a polarized light transmission axis of the second display layer are in parallel to each other.

12. An article comprising the optical layered body according to claim 7.

* * * * *